US009870543B2

(12) United States Patent
Šitina et al.

(10) Patent No.: US 9,870,543 B2
(45) Date of Patent: Jan. 16, 2018

(54) CUSTOM-BRANDED ANALYTIC APPLICATIONS IN A MULTI-TENANT ENVIRONMENT

(71) Applicant: GoodData Corporation, San Francsicso, CA (US)

(72) Inventors: Jiří Šitina, Holice (CZ); Zdenek Svoboda, Praha (CZ); Ondrej Valka, Postřelmov (CZ); Jakub Sedlacek, Praha (CZ); Zdenek Kostal, Břeclav (CZ); Chanakya C. Damarla, Fremont, CA (US); Hubert Palan, San Francisco, CA (US); Oliver H. Plattner, San Francisco, CA (US)

(73) Assignee: GoodData Corporation, San Francico, CA (US)

( * ) Notice: Subject to any disclaimer, the term of this patent is extended or adjusted under 35 U.S.C. 154(b) by 0 days.

(21) Appl. No.: 14/051,469

(22) Filed: Oct. 11, 2013

(65) Prior Publication Data
US 2015/0046204 A1 Feb. 12, 2015

Related U.S. Application Data

(60) Provisional application No. 61/865,132, filed on Aug. 12, 2013.

(51) Int. Cl.
*G06Q 10/00* (2012.01)
*G06Q 10/06* (2012.01)

(52) U.S. Cl.
CPC .................. *G06Q 10/063* (2013.01)

(58) Field of Classification Search
CPC .............. G06Q 30/0201; G06Q 30/02; G06Q 30/0202; G06Q 10/06375; G06Q 10/0639;
(Continued)

(56) References Cited

U.S. PATENT DOCUMENTS 4,864,497 A  9/1989 Lowry et al.
5,930,764 A * 7/1999 Melchione et al. ......... 705/7.29
(Continued)

FOREIGN PATENT DOCUMENTS

WO   WO 2008/106783 A1   9/2008

OTHER PUBLICATIONS

Bhatia, S., "High Performance Custom Fields for MultiTenant SaaS Architectures" (4 pages), accessed at: https://www.izenda.com/blog/high-performance-custom-fields-for-multi-tenant-saas-architectures/.*

(Continued)

*Primary Examiner* — Tiphany B Dickerson
(74) *Attorney, Agent, or Firm* — Fenwick & West LLP

(57) ABSTRACT

A consolidated business intelligence platform provides customized business analytics for a plurality of customer databases, each associated with a corresponding plurality of customers. Responsive to a request from a user for a customized business intelligence interface, the system determines a customer of the plurality of customers with which the user is affiliated; accesses a set of customization parameters for the determined customer, the customization parameters including a set of data analytics parameters and a set of data display parameters; and identifies, from the plurality of customer databases, a customer database associated with the determined customer. The system analyzes a dataset from the identified customer database using the set of data analytics parameters, and then formats the analyzed dataset for display based on the set of data display parameters, thereby generating the customized business intelligence interface for transmission to the user.

19 Claims, 18 Drawing Sheets

(58) Field of Classification Search
CPC ........ G06Q 10/06393; G06Q 10/06395; G06F 17/30592
USPC ...................................... 705/7.29–7.33, 7.38
See application file for complete search history.

(56) References Cited

U.S. PATENT DOCUMENTS

| | | | |
|---|---|---|---|
| 5,978,790 A | 11/1999 | Buneman et al. | |
| 6,356,913 B1 | 3/2002 | Chu et al. | |
| 6,553,563 B2 | 4/2003 | Ambrose et al. | |
| 6,662,202 B1 | 12/2003 | Krusche et al. | |
| 6,831,668 B2 | 12/2004 | Cras et al. | |
| 6,859,798 B1* | 2/2005 | Bedell | G06Q 10/06 706/45 |
| 7,003,560 B1 | 2/2006 | Mullen et al. | |
| 7,076,782 B2 | 7/2006 | Smith | |
| 7,149,734 B2 | 12/2006 | Carlson et al. | |
| 7,151,438 B1* | 12/2006 | Hall | G06Q 10/10 340/286.06 |
| 7,779,039 B2* | 8/2010 | Weissman | G06F 17/30595 707/793 |
| 7,783,672 B2 | 8/2010 | Whalen et al. | |
| 7,797,289 B2 | 9/2010 | Chan et al. | |
| 7,809,698 B1 | 10/2010 | Salz et al. | |
| 7,895,563 B2 | 2/2011 | Carlson et al. | |
| 8,356,274 B2* | 1/2013 | Kwok | G06Q 10/10 717/101 |
| 8,370,359 B2 | 2/2013 | Byrne et al. | |
| 8,521,655 B2* | 8/2013 | Carter | G06Q 20/14 705/317 |
| 8,862,632 B2* | 10/2014 | Ziemann | G06F 17/30292 707/803 |
| 9,253,254 B2* | 2/2016 | Nowack | H04L 63/0823 |
| 2002/0059264 A1* | 5/2002 | Fleming | G06Q 40/02 |
| 2003/0182470 A1 | 9/2003 | Carlson et al. | |
| 2005/0010566 A1 | 1/2005 | Cushing et al. | |
| 2006/0069585 A1* | 3/2006 | Springfield et al. | 705/1 |
| 2006/0206890 A1 | 9/2006 | Shenfield et al. | |
| 2006/0212543 A1 | 9/2006 | O'Farrell et al. | |
| 2006/0259392 A1 | 11/2006 | Rabenold et al. | |
| 2007/0130517 A1 | 6/2007 | Wu | |
| 2007/0157287 A1 | 7/2007 | Lim | |
| 2007/0260625 A1 | 11/2007 | Tien et al. | |
| 2007/0265863 A1 | 11/2007 | Tien et al. | |
| 2008/0294996 A1* | 11/2008 | Hunt | G06Q 30/02 715/739 |
| 2009/0210855 A1 | 8/2009 | Ramanathan | |
| 2009/0282045 A1* | 11/2009 | Hsieh | G06F 21/6218 |
| 2011/0246449 A1* | 10/2011 | Collins | G06F 17/30463 707/715 |
| 2012/0011077 A1* | 1/2012 | Bhagat | G06F 21/554 705/317 |
| 2012/0041921 A1* | 2/2012 | Canaday | G06F 17/30507 707/607 |
| 2012/0089564 A1 | 4/2012 | Bakalash et al. | |
| 2012/0284312 A1* | 11/2012 | Gore | G06Q 30/01 707/810 |
| 2013/0073340 A1* | 3/2013 | Alex et al. | 705/7.33 |
| 2013/0325504 A1 | 12/2013 | Green et al. | |
| 2014/0074558 A1* | 3/2014 | Jain | G06Q 10/0637 705/7.36 |
| 2014/0081903 A1* | 3/2014 | Koosel et al. | 707/602 |
| 2014/0289391 A1* | 9/2014 | Balaji | H04L 43/04 709/224 |
| 2015/0026165 A1* | 1/2015 | Louie et al. | 707/723 |

OTHER PUBLICATIONS

Tsai, Wei-Tek, et al., "SaaS Multi-Tenant Application Customization," SOSE '13 Proceedings of the 2013 IEEE Seventh International Symposium on Service-Oriented System Engineering, Mar. 25-28, 2013, pp. 1-12.*
PCT International Search Report and Opinion, PCT Application No. PCT/US2014/66092, dated Feb. 6, 2015, eight pages.

* cited by examiner

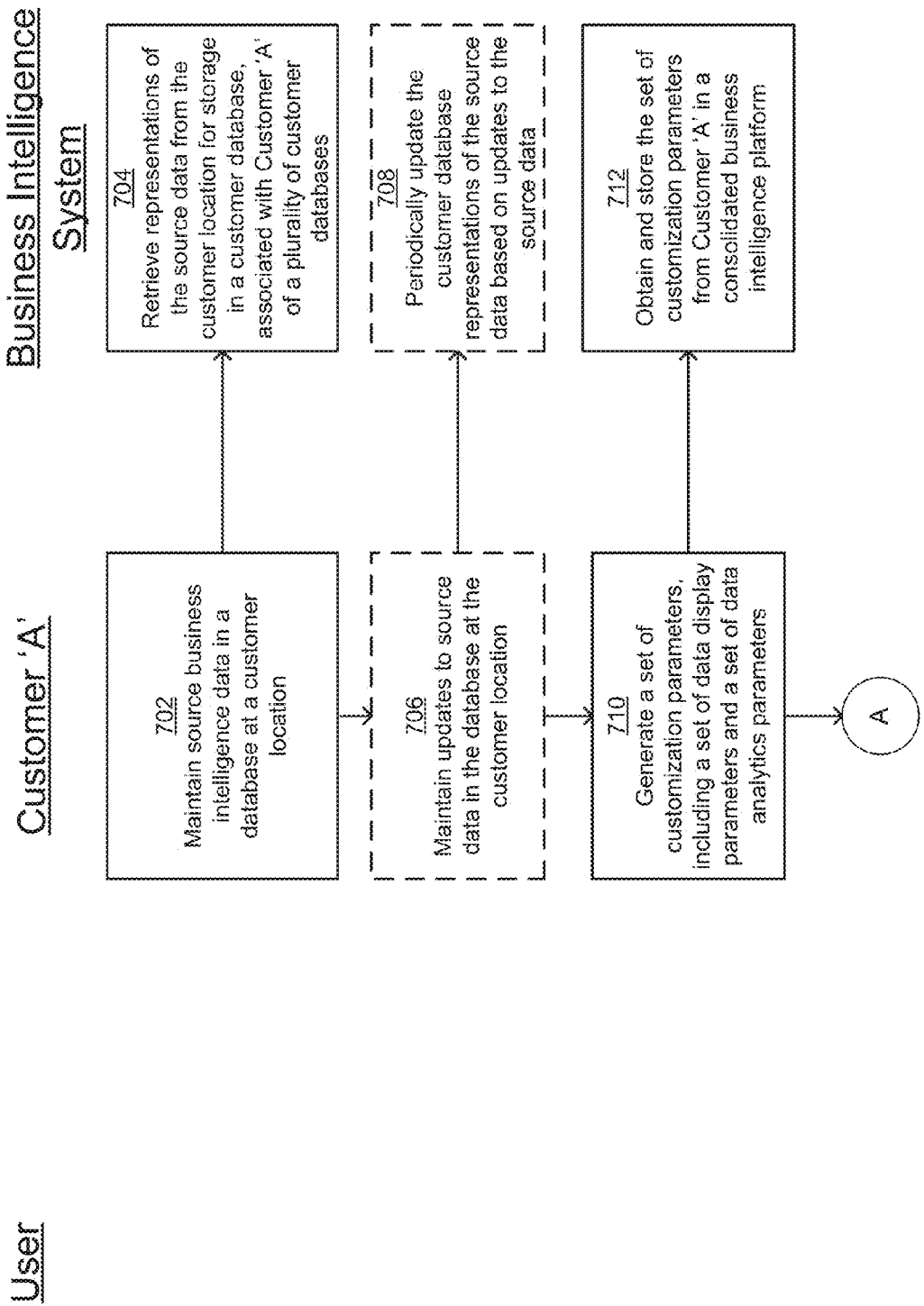

800

814
Responsive to a request from a user for a customized business intelligence interface, the request including identification information associated with the user:

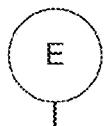

834
Disable the user from modifying one or more parameters of the set of customization parameters, thereby assign the user view-only rights to one or more user interface elements of the customized business intelligence interface

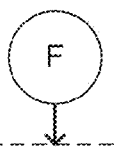

836
Provide the user modification rights to one or more parameters of the set of customization parameters, thereby enable the user to modify one or more parameters of: the set of data analytics parameters and the set of data display parameters, so as to modify one or more user interface elements of the customized business intelligence interface

*FIG. 8C*

CUSTOM-BRANDED ANALYTIC APPLICATIONS IN A MULTI-TENANT ENVIRONMENT

RELATED APPLICATIONS

This application claims the benefit of Provisional Application No. 61/865,132, filed on Aug. 12, 2013, which is hereby incorporated herein by reference in its entirety.

BACKGROUND

This invention relates generally to a system and methods for providing business analytics solutions to customers and more specifically to providing custom-branded analytic applications.

SUMMARY

Business intelligence analytics are frequently complex and data-intensive. Furthermore, customer needs for business intelligence analytics often vary widely based on customer-segments and customer-data, creating a need for business intelligence solutions that are customized based on specific customer-segments and customer-data.

Some approaches to providing customized business intelligence solutions involve segregating, isolating, and tailoring analytics platforms and analytics infrastructure to different customer-segments and customer-data so as to create a separate tailored analytics platform for each of the different customer segments and, optionally, for each of the different customer data types.

The instant approach to providing customized business analytics to customers leverages a common consolidated multi-tenant analytics platform that has the flexibility to service a variety of customer-segments and customer-data, thereby reducing computational and storage overhead associated with duplication of analytics infrastructure.

BRIEF DESCRIPTION OF THE DRAWINGS

FIGS. 7A-7D include a flowchart illustrating a method for providing a customized business intelligence interface, in accordance with some embodiments.

FIGS. 8A-8C include a flowchart illustrating a method performed on a business intelligence system for providing a customized business intelligence interface, in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Business Intelligence Analytics

Business intelligence refers to methodologies, processes, architectures, and technology used to identify and analyze business data (e.g., data of commercial or business value to an organization, project, department, or product; such as data corresponding to profits, sales, gross margin, revenues, customer retention rates, customer lifetime values, customer renewal rates, customer engagement rates, customer satisfaction scores, and the like) in order to enable efficient and effective strategic, tactical, and operational insights and decision-making.

Business data is optionally categorized or segmented based on organizations, departments, projects, products, and so on. In other words, different organizations, departments, projects, and products optionally have different underlying business data and therefore employ different methods to analyze the underlying business data to produce different results.

Analysis of business data or business analytics is the process of transforming raw, unprocessed business data into processed meaningful output, in order to distil key patterns or statistical trends from the underlying raw data (e.g., trends and patterns not directly obvious from the raw data) thereby facilitating a viewing user to make speedy and meaningful conclusions from the business data.

Stated differently, business analytics is a process of using a collection of business data to search for and identify patterns (e.g., statistical patterns or trends) in the business data that provide valuable insight into specific business processes. The processed business data is optionally presented or displayed in the form of a visual user interface (e.g., a report, a dashboard, a collection of charts and so on) that intuitively summarizes key patterns or statistical trends underlying the raw data.

Since underlying business data and business needs vary widely from customer to customer, the analysis methods and approaches for analyzing business data are different for different customers. As a result, there is need for business intelligence solutions that can be customized based on customer segments and customer data.

System Architecture

Figure 1A:
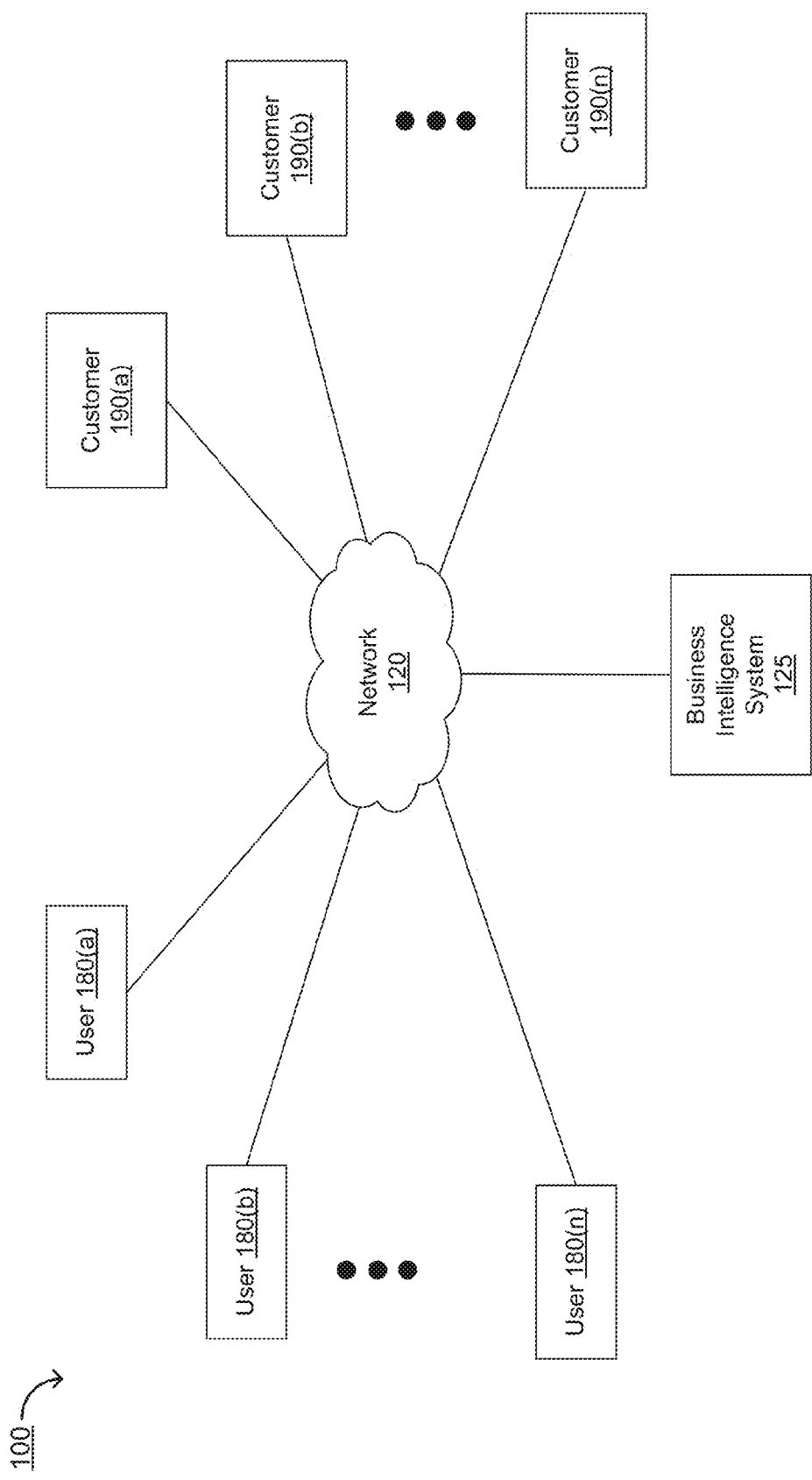
FIGS. 1A-1B illustrate block diagrams of a system environment for providing customized business analytics solutions, according to some embodiments.

FIG. 1A is a high level block diagram of a business intelligence environment 100 for business intelligence system 125. The business intelligence environment 100 comprises one or more users 180 (e.g., user 180(a), 180(b), and the like), a network 120, one or more customers 190 (e.g., customer 190(a), 190(b), and the like), and a business intelligence system 125.

The users 180 include one or more computing devices capable of receiving user input as well as transmitting and/or receiving data via the network 120. In some embodiments, a user 180 corresponds to or includes a client device such as a conventional computer system (e.g., a desktop or laptop computer), or a device having computer functionality such as a personal digital assistant (PDA), a mobile telephone, a smartphone or another suitable device. In some embodiments, the client device is configured to communicate via the network 120 with the business intelligence system 125 and with one or more customers 190.

In some embodiments, in the business intelligence environment 100, a user (of the users 180) is associated with or authenticated by a customer (of the customers 190). Business intelligence system 125 stores business data and customization metadata (e.g., customization parameters) for each of the customers 190. Responsive to a user request (e.g., received via network 120), business intelligence system 125 generates and provides (e.g., via network 120) a customized business intelligence interface for display to the requesting user based on business intelligence data and customization metadata associated with a respective customer with which the requesting user is associated.

In some embodiments, a client device at user 180 executes an application allowing the user 180 of the client device to interact with the business intelligence system 125 and with one or more customers 190. For example, a client device at user 180 executes a browser application to enable interaction between the client device and the business intelligence system 125 via the network 120. In another embodiment, a user 180 interacts with the business intelligence system 125 through an application programming interface (API) running on a native operating system, such as IOS® or ANDROID™, of the client device.

The users 180 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Additionally, one or more customers 190 are coupled to the network 120 for communicating with the business intelligence system 125. In some embodiments, as described further with reference to FIG. 1B, customers 190 include source databases for storing business intelligence data at the customer location. Additionally, customers 190 store parameters for configuring analytics and display of the business intelligence data by one or more users 180. Furthermore, in some embodiments, customers 190 store and provide identification information used to authenticate one or more of the users 180 that have access rights to the business intelligence analytics, associated with the customers 190.

Figure 1B:
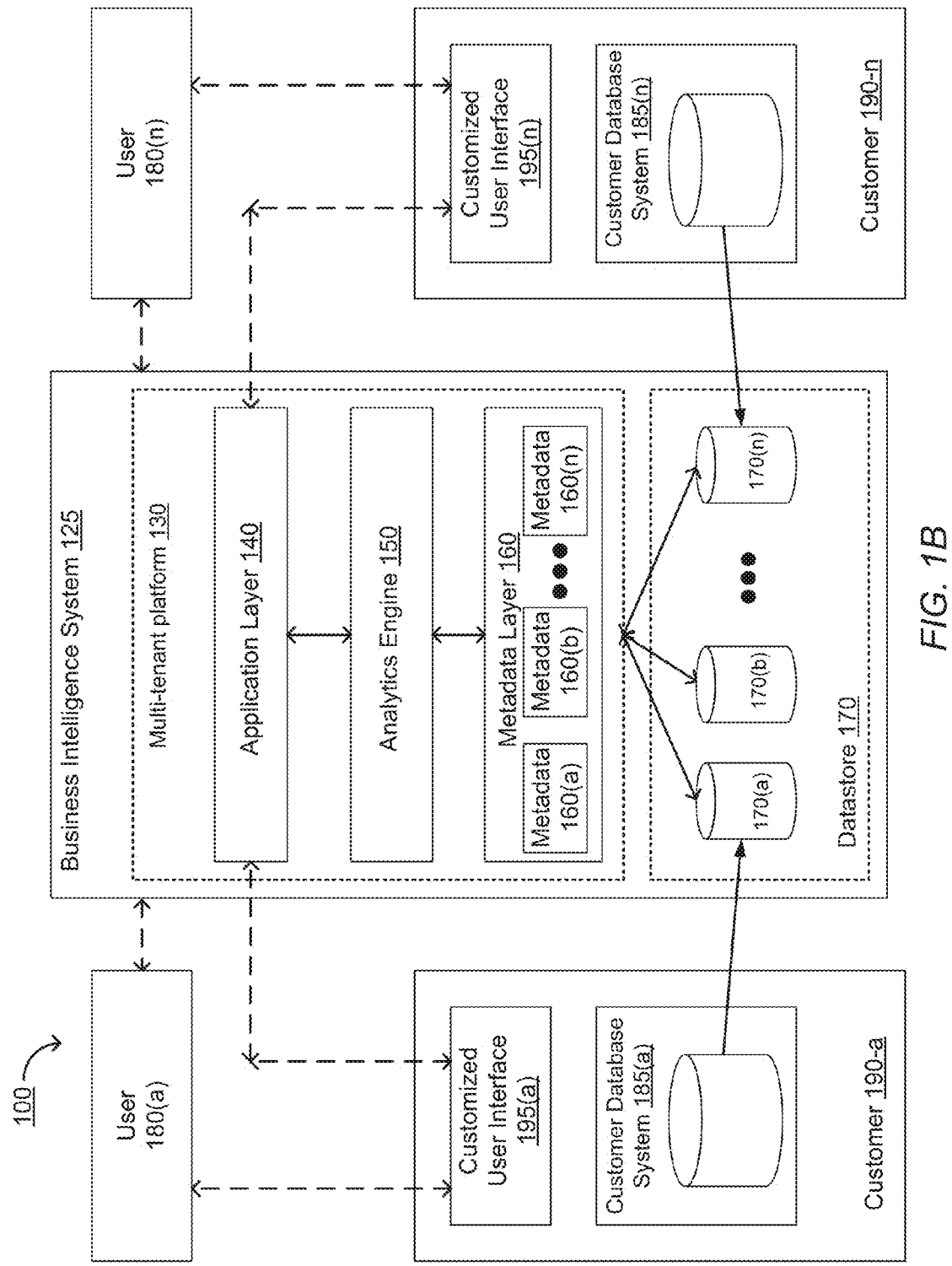

FIG. 1B is another example block diagram of a business intelligence environment 100 for providing customized business analytics solutions, according to some embodiments. Business intelligence environment 100 shown in FIG. 1B includes business intelligence system 125, one or more customers 190, and one or more users 180.

Business intelligence system 125 stores business data and customization metadata (e.g., customization parameters) for each of the customers 190, corresponding to the business intelligence needs of the customers 190. Upon receiving a request from a respective one of the users 180 associated with a respective one of the customers 190, business intelligence system 125 analyzes business data corresponding to the respective customer based on the customization metadata associated with the respective customer. Business intelligence system 125 then generates and provides a customized business intelligence interface for display to the respective user.

In some embodiments, business intelligence system 125 transmits the generated customized business intelligence interface for display directly to the respective user. In alternative embodiments, business intelligence system 125 transmits the generated customized business intelligence interface to the respective customer. The respective customer, in turn, optionally stores the customized business intelligence interface (e.g., customized user interface 195(*a*) stored by customer 190(*a*)) at the customer site. The respective customer then provides the customized business intelligence interface, for display, to the respective user. In such embodiments, the customized user interface at the respective customer is optionally updated based on the customization metadata (e.g., customization parameters) stored at the business intelligence system 125 and associated with the respective customer.

Accordingly, in some embodiments, business intelligence system 125 includes datastore 170 and multi-tenant-platform 130. Datastore 170 optionally maintains a plurality of customer databases 170(*a*), 170(*b*), and the like. Each database of the plurality of customer databases in datastore 170 includes data representative of corresponding source data stored at a corresponding customer location. For example, customer database 170(*a*) in datastore 170 stores data representative of source data stored in customer database system 185(*a*) at customer 190(*a*). Similarly, customer database 170(*n*) in datastore 170 stores data representative of source data (e.g., business data stored at the customer location) stored in customer database system 185(*n*) at customer 190(*n*).

Although FIG. 1B shows that data representative of source customer data is stored in datastore 170, of the business intelligence system 125, at the plurality of customer databases 170(*a*), 170(*b*), and the like, in practice, and as recognized by those of ordinary skill in the art, such customer data or data representative of such customer data could be stored at and accessed from one or more systems remote from the business intelligence system (e.g., a customer location, a third party location, and so on).

In some embodiments, business intelligence system 125 retrieves representations of source data (e.g., optionally with modifications to the source data to facilitate efficient query-processing) from a customer location (e.g., from a customer server remote from the business intelligence system 125) corresponding to the particular customer to store in a particular customer database. In some embodiments, business intelligence system 125 periodically updates the particular database based on modifications to the source data stored at the customer location. In some embodiments, modifications to the source data are periodically pushed to datastore 170 from the customer location. In alternative embodiments, modifications to the source data are actively pulled from the customer location periodically into the datastore 170.

Multi-tenant platform 130 of business intelligence system 125 (alternatively referred to herein as a consolidated business intelligence platform) interfaces with and queries the plurality of customer databases in datastore 170. Multi-tenant-platform 130 includes a unified metadata layer 160 that stores metadata for each of the customers 190 (e.g., metadata 160(*a*) for customer 190(*a*), metadata 160(*b*) for customer 190(*b*), and the like). In some embodiments, metadata for each of the customers includes a set of customization parameters (e.g., including a set of data display parameters and a set of data analytics parameters) for the respective customer. The single consolidated multi-tenant platform that stores customization parameters for each of the plurality of customers and is capable of querying each of the plurality of databases provides improved storage and performance efficiency over separate analytics platforms targeted to serve each individual customer.

In some embodiments, the set of customization parameters for a particular customer is custom-provided by the particular customer so as to control visual appearance (e.g., as explained with reference to FIGS. 2A-2B) and functionality (e.g., as explained with reference to 3A-3D, 4A-4D, 5A-5B, and 6A-6D) of customized business analytics rendered for display to one or more users affiliated with the particular customer.

In some embodiments, unified metadata layer 160 additionally stores common or shared metadata (e.g., a common or shared set of data display parameters, and a common or shared set of data analytics parameters) that is common or shared between all of the customers 190 and is used by business intelligence system 125 to control visual appearance and functionality of customized business analytics rendered for display to users affiliated with all of the customers 190.

In some embodiments, multi-tenant platform 130 of business intelligence system 125 includes an analytics engine 150 that is configured to (e.g., responsive to a request from a particular user affiliated with a particular customer) analyze a dataset retrieved from a particular customer database corresponding to the particular customer based on the set of data analytics parameters for the particular customer. Toward this end, in some embodiments, analytics engine 150 accesses a set of customization parameters (e.g., metadata) for the particular customer, from the metadata layer 160, to obtain a set of data analytics parameters for the particular customer. Analytics engine 150 then formulates one or more customized database queries based on: the set of data analytics parameters for the determined customer and one or more properties (e.g., type of business intelligence data, physical data storage type or logical data storage type or logical schema) of the identified customer database and executes the one or more customized database queries on a customer database, to analyze the dataset (e.g., as explained further with reference to FIGS. 3A-3D, 4A-4D, 5A-5B, and 6A-6D).

In some embodiments, business data stored in a first customer database corresponding to a first customer (e.g., customer database 170(a) corresponding to customer 190(a)) is distinct in data type from business data stored in a second customer database corresponding to a second customer (e.g., customer database 170(n) corresponding to customer 190(n)). For example, the first customer database includes financial data records for an organization, including chronologically generated financial statements, quarterly earnings and the like; whereas the second customer database includes customer relation information for an organization, such as customer referrals, customer renewals, customer satisfaction data, and the like.

Additionally, in some embodiments, the physical or logical organization of business data stored in a first customer database (e.g., customer database 170(a) corresponding to customer 190(a)) is distinct from the physical or logical organization of business data stored in a second customer database (e.g., customer database 170(n) corresponding to customer 190(n)).

Consequently, the analytics engine formulates a first customized database query (or a first customized set of one or more database queries) for execution on the first customer database, based on the set of data analytics parameters for the first customer, based on one or more properties (e.g., data type, physical data storage type, logical data storage type/schema) of the first customer database, or a combination thereof.

Similarly, the analytics engine formulates a second customized database query (or a second customized set of one or more database queries) for execution on the second customer database, based on the set of data analytics parameters for the second customer, based on one or more properties (e.g., data type, physical data storage type, logical data storage type/schema) of the second customer database, or a combination thereof. In some embodiments, the first customized database query (or the first customized set of one or more database queries) and the second customized database query (or the second customized set of one or more customized database queries), although mutually distinct, are generated by the same analytics engine to query two distinct customer databases.

In some embodiments, business intelligence system 125 includes an application layer 140 configured to (e.g., responsive to a request from a particular user affiliated with a particular customer), generate a customized business intelligence interface for transmission to the particular user.

Toward this end, the application layer 140 accesses a set of customization parameters (e.g., metadata) for the particular customer, from the metadata layer 160, to obtain a set of data display parameters for the particular customer. The application layer 140 obtains an analyzed dataset from the analytics engine 150, formats the analyzed dataset, for presentation on the customized business intelligence interface, based on the set of data display parameters; and formats, based on the set of data display parameters, one or more additional user interface elements (e.g., text, graphical content, or metadata) associated with the customized business intelligence interface (e.g., as explained further with reference to FIGS. 2A-2B).

Set of Data Display Parameters

As described above with reference to FIG. 1B, the business intelligence system generates a customized business intelligence interface for transmission to a user affiliated with a particular customer based on a set of customization parameters associated with the particular customer and stored at the consolidated business intelligence platform (e.g., at the multi-tenant platform). The set of customization parameters include a set of data display parameters. The set of data display parameters include one or more parameters (and/or values of the one or more parameters), custom-provided by the particular customer and stored in the consolidated business intelligence platform.

In some embodiments, the set of data display parameters (and the values of the data display parameters) define visual display properties of text content associated with the customized business intelligence interface, such as visual display properties of titles (e.g., application title) of subject matter on the interface, text information included in the subject matter on the interface, font types and font sizes, text content of emails being composed, textual presentation or representation of analyzed business intelligence dataset displayed on the customized business intelligence interface.

In some embodiments, the set of data display parameters (and the values of the data display parameters) define visual display properties of graphical content associated with the customized business intelligence interface, such as color palettes used to display charts and analyzed business intelligence data or other forms of graphical presentation or representation of the analyzed business intelligence data, logos associated with the customer, browser favicon in a web-page address bar on the business intelligence interface, desktop icon, background images, and the like.

In some embodiments, the set of data display parameters (and the values of the data display parameters) define visual display properties of metadata content associated with the customized business intelligence interface, such as webpage URLs, domain names, link destinations, cascaded style sheets, and the like.

Figure 2A:
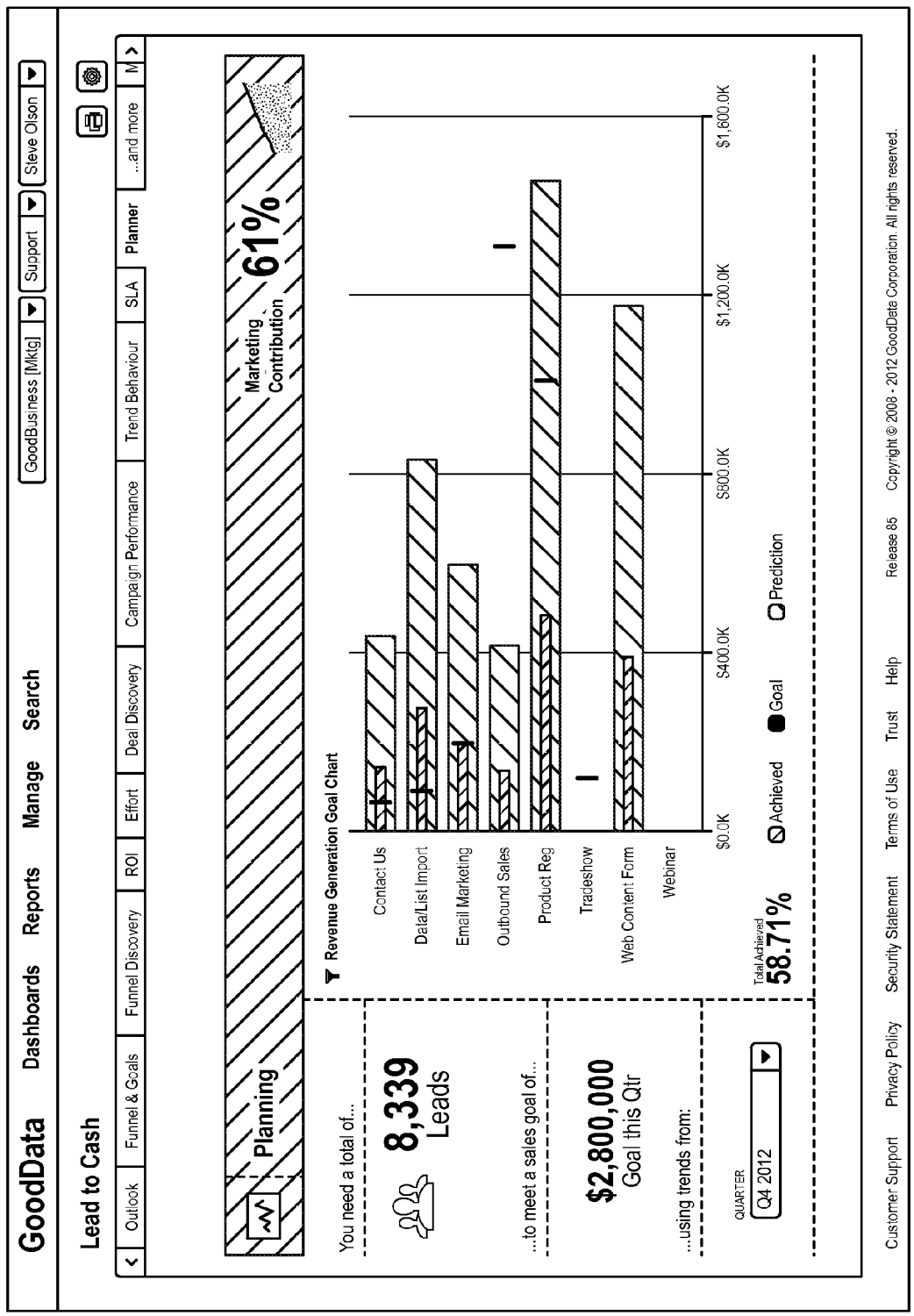
FIGS. 2A-2B include examples of user interfaces illustrating customizability of one or more parameters of a set of data display parameters in a customized business intelligence interface, in accordance with some embodiments.
Figure 2B:
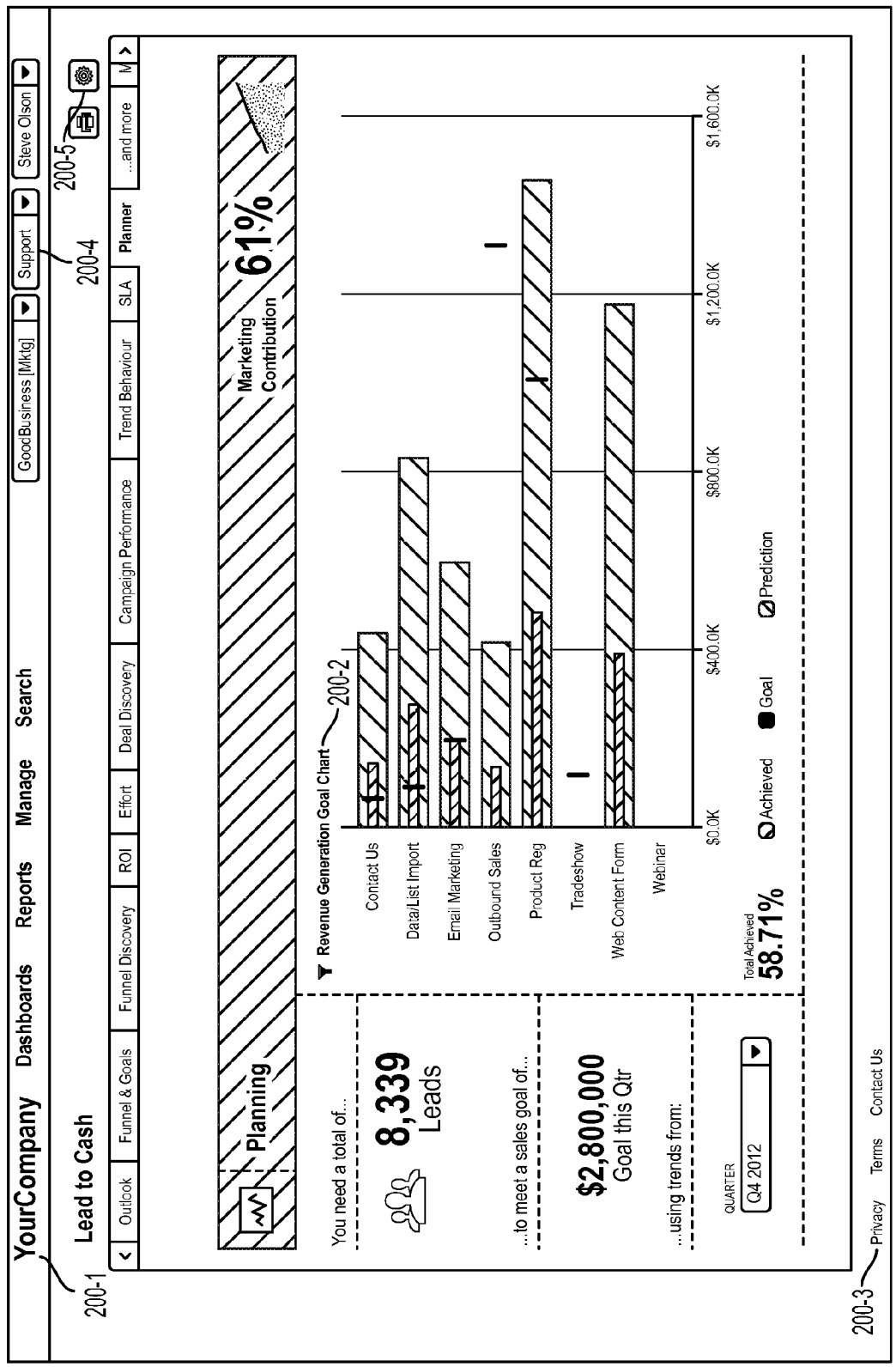

FIGS. 2A-2B include examples of user interfaces illustrating customizability of one or more parameters of a set of data display parameters in a customized business intelligence interface, in accordance with some embodiments.

FIG. 2A illustrates a customizable business intelligence user interface prior to being customized based on a specific customer's preferences. In other words, FIG. 2A illustrates a template for a business intelligence user interface prior to application of one or more parameters of a set of data display parameters corresponding to the specific customer.

FIG. 2B illustrates a customized business intelligence user interface after customization for the specific customer via application of a set of data display parameters corresponding to the specific customer. As illustrated in FIG. 2B, the set of data display parameters that are customized for the specific customer include graphical content (e.g., customer logo 200-1 and chart color palette such as font colors and fill areas in the charts 200-2), text content (e.g., the content of the user interface footer 200-3 and the login page), and metadata content (e.g., links and URL destinations 200-4 from the customized business intelligence interface are remapped based the customer's preferred web environment, and aspects of email creation and delivery 200-5 such as reporting snapshots, schedule reports, and managing user accounts are customized based on the customer's preferences).

Set of Data Analytics Parameters

The set of customization parameters for each customer includes a set of data analytics parameters for the respective customer that are accessed and used to analyze a dataset for the respective customer in order to generate the customized business intelligence user interface for the respective customer. In some embodiments, the set of data analytics parameters comprises one or more parameters (such as database schema, metric definitions, report configurations, dashboard layouts, and the like), custom-provided by the respective customer. The set of data analytics parameters stored in the consolidated business intelligence platform for each of the customers, defines an analytical framework for processing business intelligence data stored in the customer database associated with the determined customer. In such embodiment, business intelligence data includes data having information having commercial value or significance to a business entity (such as an organization, department, project, and so on).

Furthermore, an analytical framework for processing the business intelligence data may include data analysis methodology (e.g., including statistical, aggregation or dimensional analysis of the customer data; statistical methods optionally include univariate analysis, multi-variate analysis, regression analysis, factor analysis, and so on), data analysis models (e.g., logical models, physical models, conceptual models), data analysis metrics, or any combination thereof. In some embodiments, selection of an analytical framework is performed based on the nature of underlying business data and based on the customer's business needs.

In some embodiments, business analytics methods used for analyzing business data may be selected from methods such as descriptive analytics (e.g., to get insight into business data based on past historical data using reports, scorecards, clustering and so on), predictive analytics (e.g., using predictive modeling based on statistical and machine learning techniques to foresee or extrapolate future patterns from the data), prescriptive analytics (e.g., to recommend business decisions using optimization, simulations, and the like), and decisive analytics (e.g., for augmenting human decision making functionality via visual analytics to reflect human reasoning). Examples of business data and analytical frameworks for processing the business intelligence data for display in a customized business intelligence user interface are further described with reference to FIGS. 3A-3D, 4A-4D, 5A-5B, and 6A-6D.

In some embodiments, the analyzed business data displayed in the generated customized business intelligence interface comprises one or more of: a dashboard, a business report, a goal tracking interface, a performance tracking interface, one or more charts for data visualization (e.g., a pie chart, a chart with multiple concurrently plotted parameters, a bar graphs for visual comparison of multiple concurrently plotted parameters, correlation plots, a bar graph trending values of a given parameter over time, a graph trending a relationship between two or more parameters, geographical maps with data plotted over specific geographical regions, waterfall charts showing discrete changes over time, bullet charts showing performance against goals, and the like).

FIGS. 3A-3D, 4A-4D, 5A-5B, and 6A-6D include examples of business intelligence user interfaces illustrating customizability of one or more parameters of a set of data analytics parameters in a customized business intelligence interface, in accordance with some embodiments.

Figure 3A:
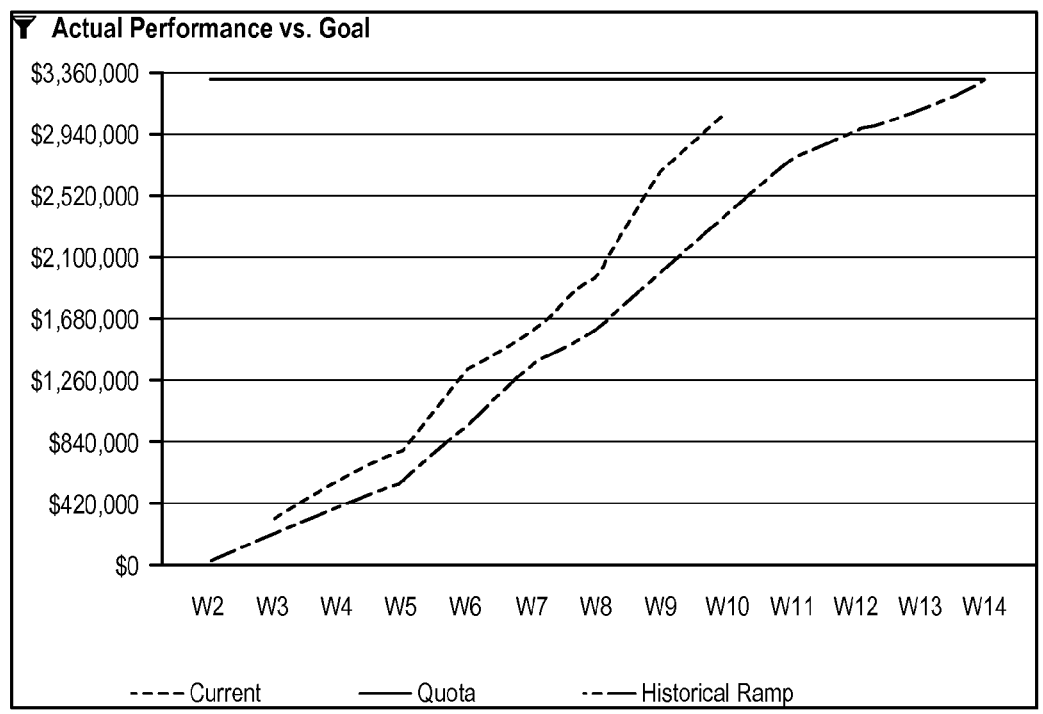
FIGS. 3A-3D, 4A-4D, 5A-5B, and 6A-6D include examples of user interfaces illustrating customizability of one or more parameters of a set of data analytics parameters in a customized business intelligence interface, in accordance with some embodiments.

As shown in FIG. 3A, in some embodiments, customized business intelligence interface includes a graphical user interface that displays a user's past or historical performance over a predefined duration of time, and enables comparison of the user's performance against the user's (or customer's) predefined goals. In such embodiments, the business intelligence system stores and accesses (e.g., queries) data corresponding to the user's past performance over varying granularities of time scale. The set of data analytics parameters optionally include parameters that specify methods to track and monitor the user's performance and parameters that specify the user's or customer's predefined goals to compare the user's performance against. This approach of visually tracking business performance compared against a predefined goal helps customers, and users affiliated with the customers, anticipate and manage risk by making business decisions in a timely manner so as to stay on track to hit predefined goals by proactively analyzing and reviewing past performance.

Figure 3B:
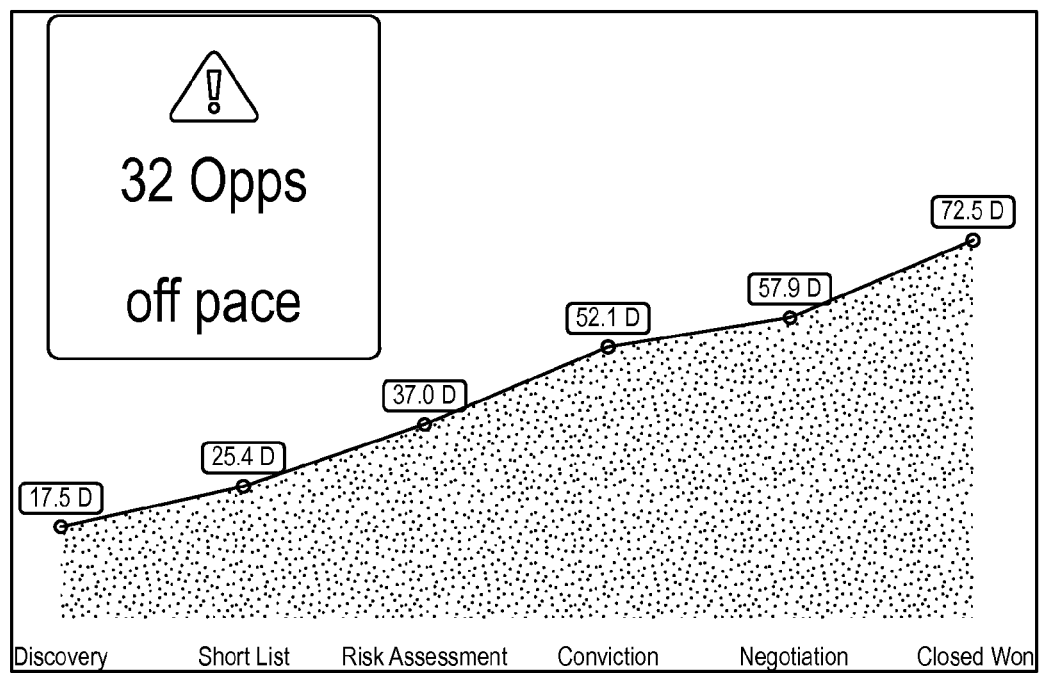

As shown in FIG. 3B, in some embodiments, customized business intelligence interface includes a graphical user interface that displays measures of a user's performance at various stages of an activity. A visual display of measurable returns obtained at each stage of an activity helps identify the stages of the business activity that drive opportunity creation. Such visualization would enable users to focus efforts on the appropriate high-return activities. In such embodiments, the business intelligence system stores and accesses (e.g., queries) business data corresponding to the various stages of an activity and measures or metrics for the user's performance at each of those stages of the activity. In such embodiments, the set of data analytics parameters include parameters that identify business activities to be measured at various stages, and various stages of the business activities at which returns are to be measured, and methods to measure or quantify and compare returns at each of these stages.

Figure 3C:
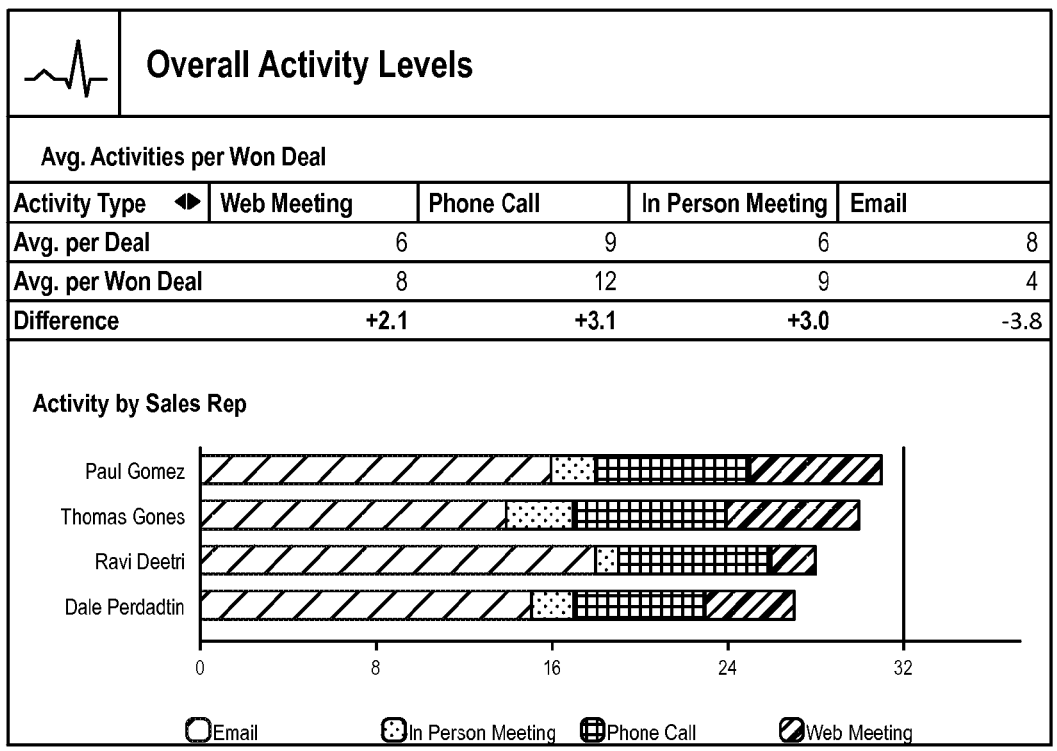

As shown in FIG. 3C, in some embodiments, customized business intelligence interface includes a graphical user interface that compares multiple complementary activities and enables visual comparison of measures of these complementary activities so as to select the best performing activity.

Such a visual comparative display of complementary activities allows users to identify and track activities that yield the strongest results.

Figure 3D:
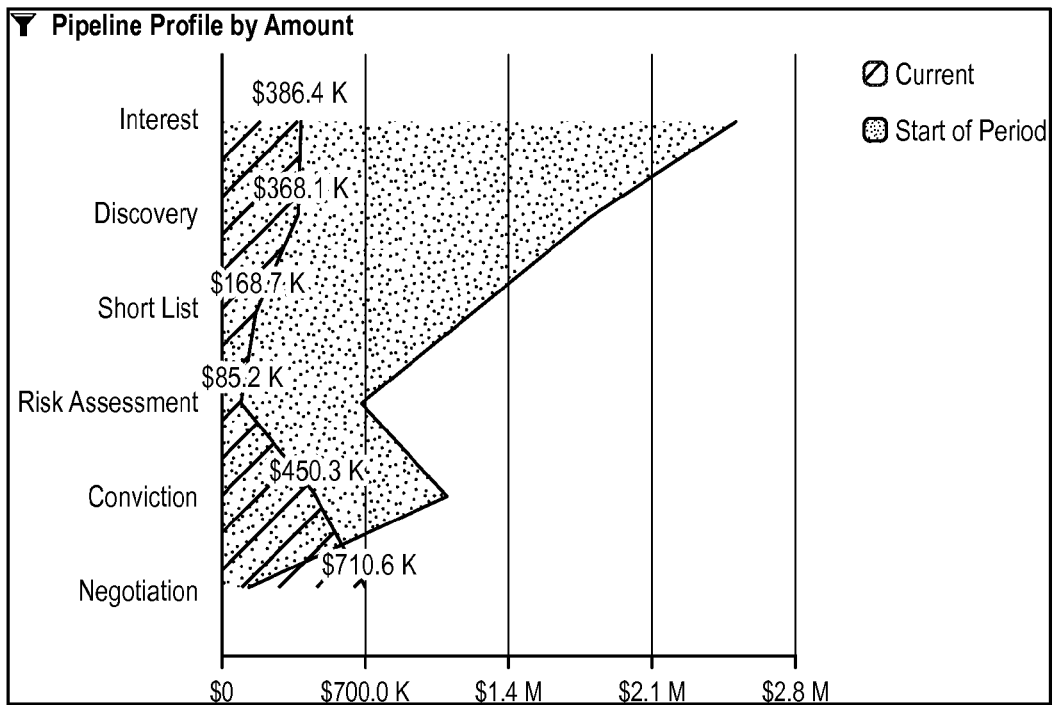

As shown in FIG. 3D, in some embodiments, customized business intelligence interface includes a graphical user interface to track a user's resources (or weighted resources) and consumption of the user's resources over different stages of an activity cycle so as to identify potential opportunities and losses along the various stages. In such embodiments, this visual display would facilitate users to identify and manage resources through high-risk, high-reward opportunities along an activity cycle and refocus resources across the various stages of the activity cycle.

Figure 4A:
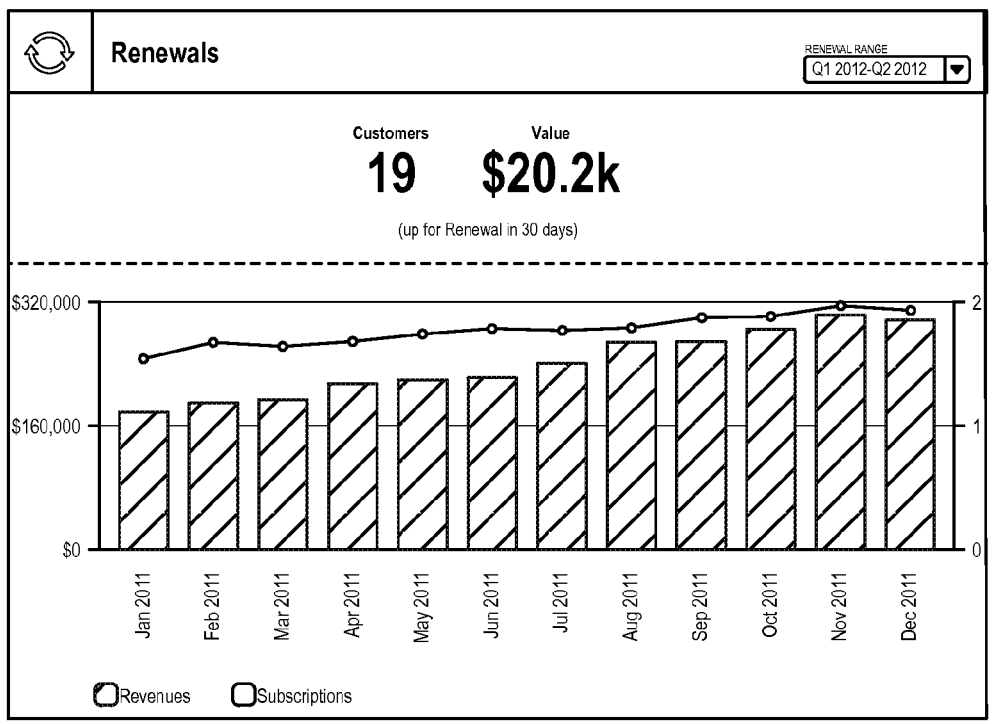

As shown in FIG. 4A, in some embodiments, customized business intelligence interface provides a predictive or forecasting visual display of upcoming or anticipated activities. For example, as shown in FIG. 4A, the customized business intelligence interface helps users plan for upcoming renewals by clients via detailed usage information. The visual interface optionally provides feedback to the user by indicating the success of any given client account.

Figure 4B:
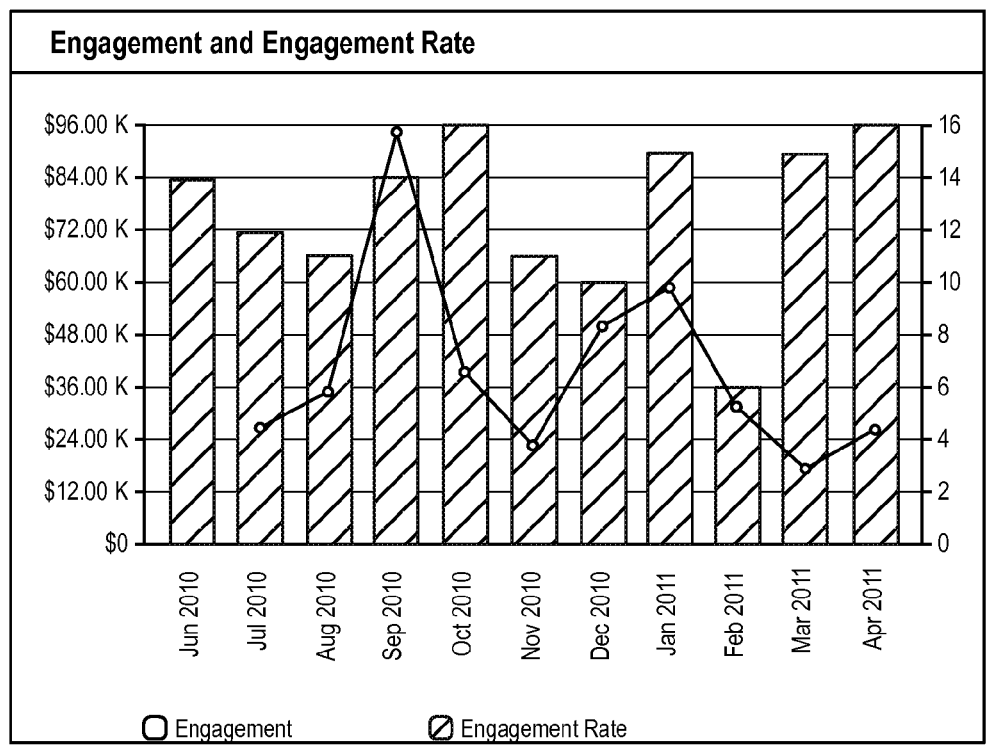

As shown in FIG. 4B, in some embodiments, customized business intelligence interface provides a visual display of single- or multi-dimensional data patterns over time to identify peaks, outliers or inflection points in the data patterns. For example, as shown in FIG. 4B, the customized business intelligence interface allows users to identify the most highly engaged clients over time and analyze and understand the characteristics that drive high client engagement. The customized business intelligence interface optionally helps users recognize increased usage by particular clients to enable potential upsells into higher product tiers.

Figure 4C:
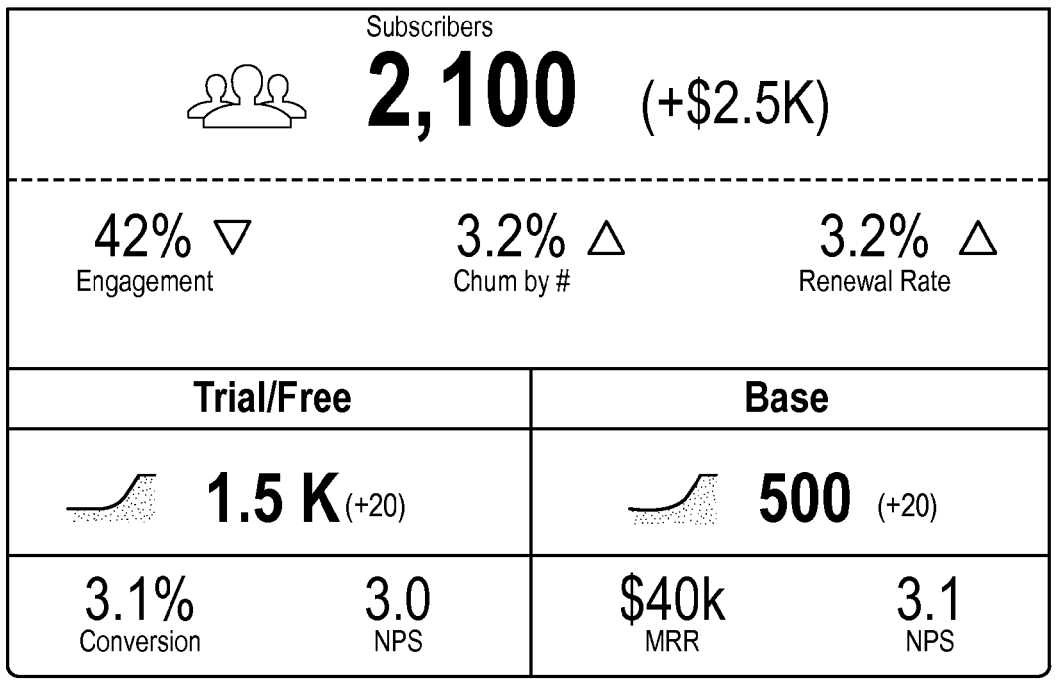

As shown in FIG. 4C, in some embodiments, customized business intelligence interface provides a visual display of a snapshot of various performance metrics at a current time point. For example, the customized business intelligence interface provides a visual analysis of segmentation patterns for a user's business (e.g., so as to identify which client subscription tiers are most successful or profitable to the user, recognize the current status of the user's business and compare it against the user's expectations and goals, and the like).

Figure 4D:
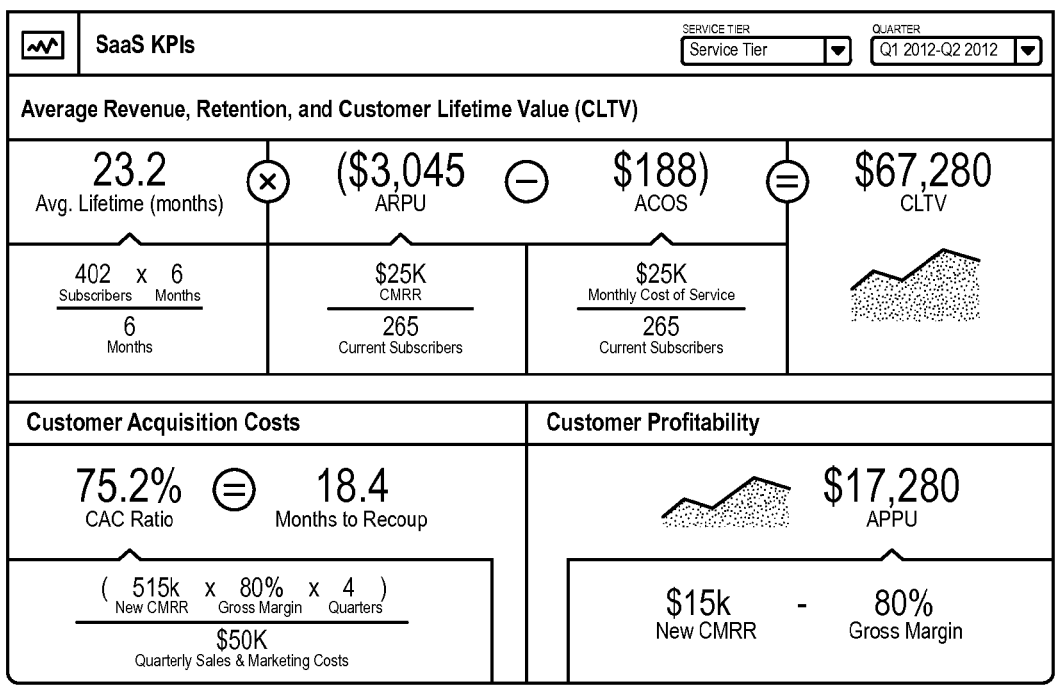

As shown in FIG. 4D, in some embodiments, customized business intelligence interface provides visualization for various metrics of a user's business or commercial performance (e.g., average subscriber or client lifetime, revenue, retention, client or customer lifetime value, profitability, acquisition costs, and the like) measured against industry gold standards.

Figure 5A:
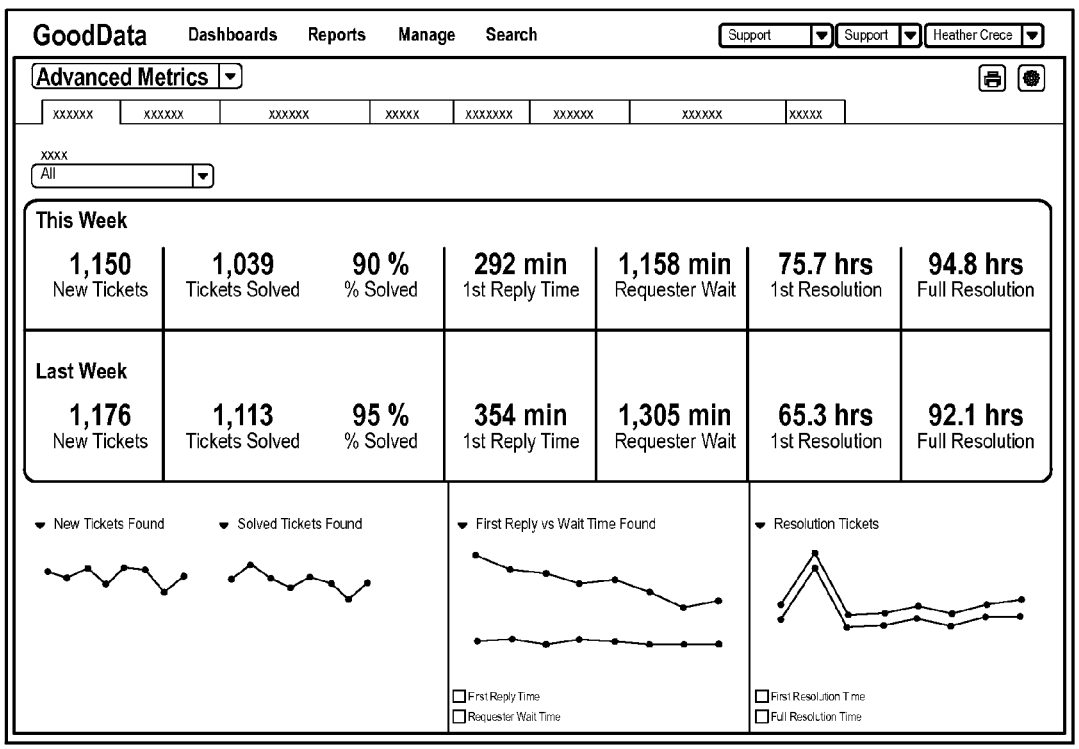

As shown in FIG. 5A, in some embodiments, customized business intelligence interface provides visualization for key performance indicators (e.g., volume of tickets sold, first-time resolution, average requestor wait time, average reply times, and the like) to enable users to understand and benchmark trends in the performance indicators over various granularities of time and to analyze how various different activities undertaken by the user impact the key performance indicators. For example, if a user's objectives are to increase productivity, team performance (e.g., minimize reply times) and profitability (e.g., maximize the number of tickets sold) within a department and if key metrics set by the user are not in line with the user's predefined targets for productivity, team performance, and profitability, then the customized business intelligence interface that displays these metrics would provide instant visual feedback to the user signaling a warning to the user.

Figure 5B:
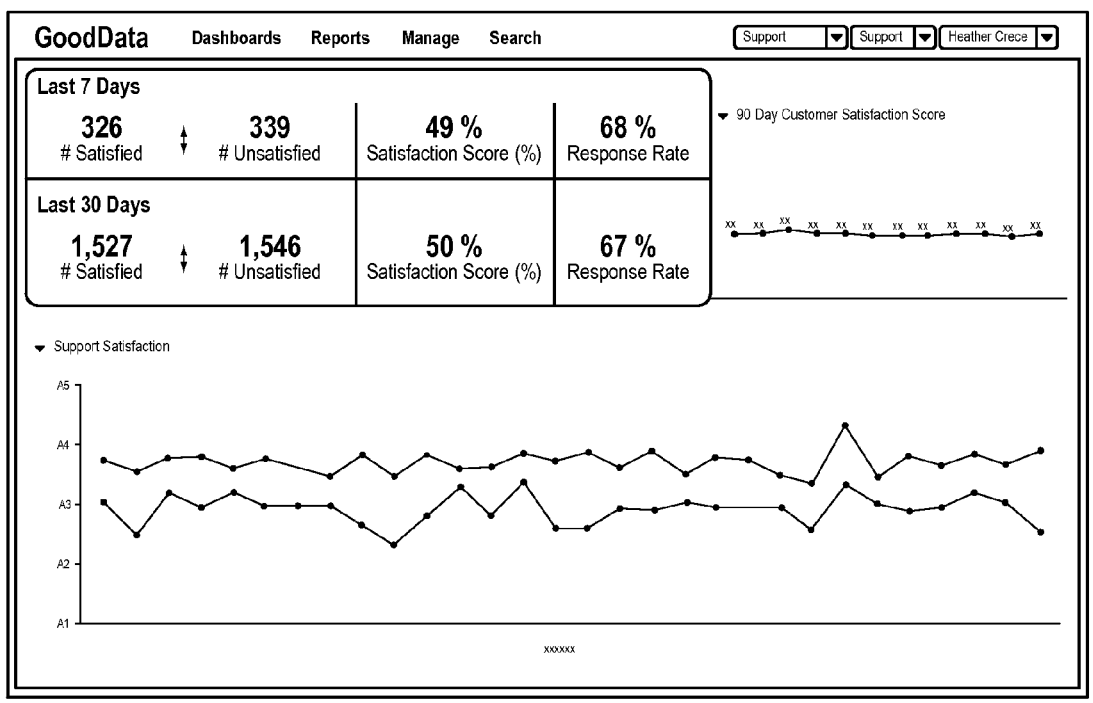

As shown in FIG. 5B, in some embodiments, customized business intelligence interface provides a visual dashboard displaying various metrics for measuring quality of client interactions (e.g., to monitor and improve client satisfaction scores and response rates).

Figure 6A:
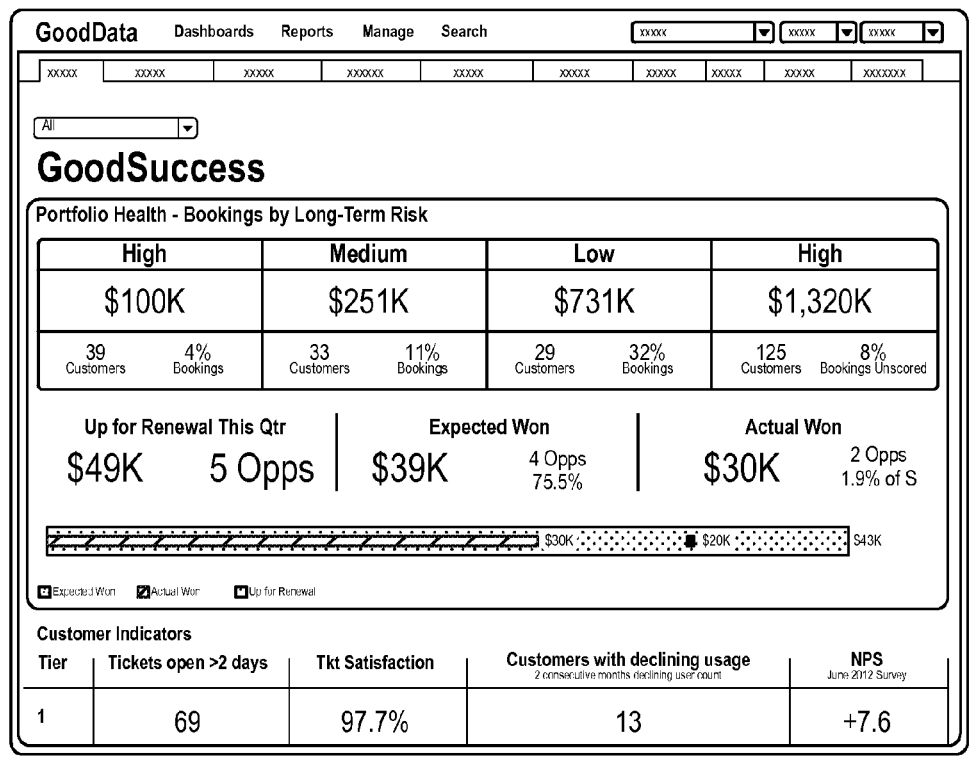

As shown in FIG. 6A, in some embodiments, customized business intelligence interface includes a dashboard interface for providing a visual indication of portfolio health (e.g., for an investment portfolio), risk profiles, and the like. The interface enables a user to evaluate client accounts based on level of risk to assess the health of the client base. In such embodiments, the customized business intelligence interface provides the user—on a daily, weekly and quarterly basis—a view of the risk level and portfolio health.

Figure 6B:
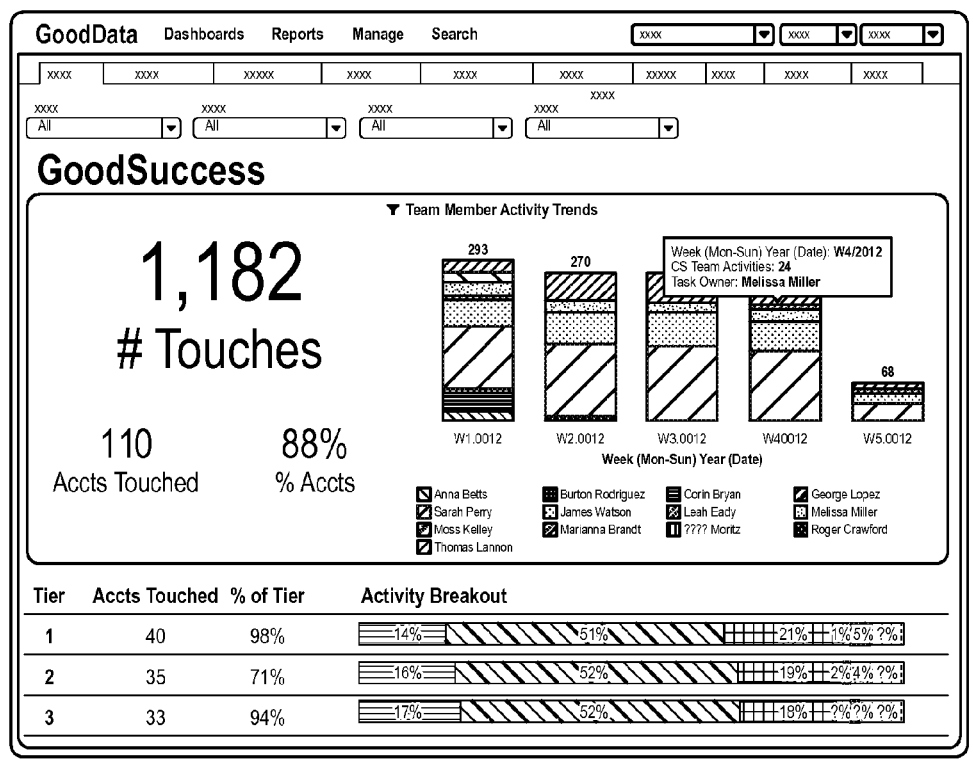

As shown in FIG. 6B, in some embodiments, customized business intelligence interface provides a measure for improving client success or satisfaction by highlighting investments made by an organization to achieve various levels of client success, accompanied by a breakdown of activities undertaken to achieve client success. The user interface enables users to monitor and assess engagement activities undertaken and quantifiable client success results from those activities.

Figure 6C:
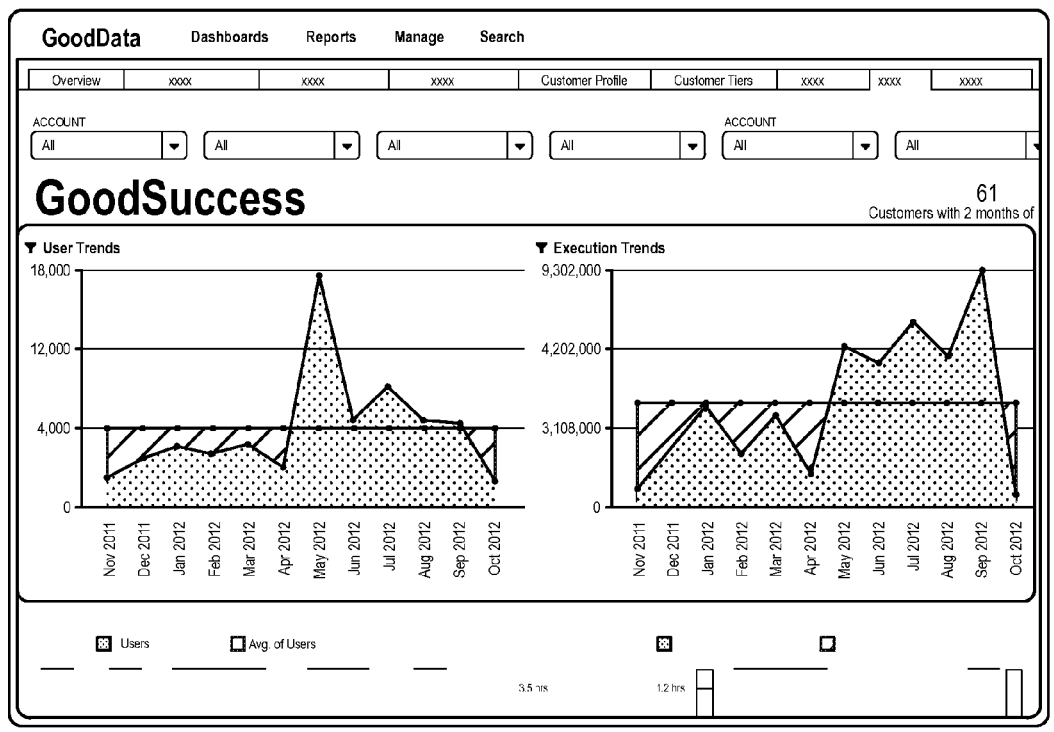

As shown in FIG. 6C, in some embodiments, customized business intelligence interface provides a visual measure to track product adoption by clients and product usability, for example, to assess how many client accounts may be in a declining usage state. This would enable a user to preemptively develop plans to address possible issues associated with declining product usage or product adoption (e.g., to identify bottlenecks or concerns such as problems associated with the actual delivery of the product to clients, and the like).

Figure 6D:
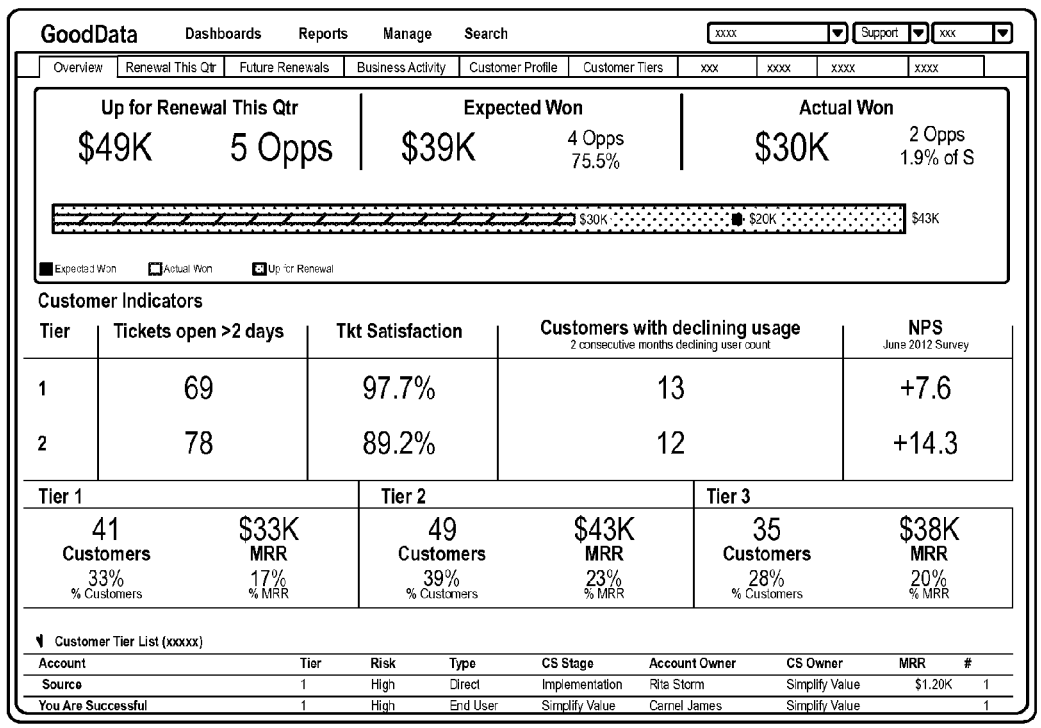

As shown in FIG. 6D, in some embodiments, customized business intelligence interface provides an interface to facilitate maximization of client renewal rates. For example, customized business intelligence provides an analysis of client renewal data to enable users to proactively develop up-sell and cross-sell strategies, to periodically track renewal probability and progress, to view the clients by tier and the impact of their associated monthly recurring revenue, to view the clients that have up-sell and cross-sell account plans and to determine what activity would be needed to accelerate the renewal opportunities.

Providing a Customized Business Intelligence Interface

FIGS. 7A-7D include a flowchart illustrating a method 700 for providing a customized business intelligence interface, in accordance with some embodiments.

FIG. 7A illustrates operations associated with storing and segmenting, customer data and customization parameters associated with a particular customer (e.g., Customer 'A') in the business intelligence system.

Accordingly, Customer 'A' maintains (702) source business intelligence data in a database at a customer location. Business intelligence system retrieves (704) representations of the source data from the customer location for storage in a customer database, associated with Customer 'A' of a plurality of customer databases (e.g., customer databases 170 explained with reference to FIG. 1B). Customer 'A' maintains (706) updates to source data in the database at the customer location. Business intelligence system periodically updates (708) the customer database representations of the source data based on updates to the source data so as to maintain a current representation of the source data. Customer 'A' generates (710) a set of customization parameters, including a set of data display parameters (e.g., as explained with reference to FIGS. 2A-2B above) and a set of data analytics parameters (e.g., as explained with reference to 3A-3D, 4A-4D, 5A-5B, and 6A-6D above). Business intelligence system obtains and stores (712) the set of customization parameters from Customer 'A' in a consolidated business intelligence platform (e.g., as metadata stored in conjunction with Customer 'A' in the unified metadata layer 160 of multi-tenant-platform 130 shown in FIG. 1B).

Figure 7B:
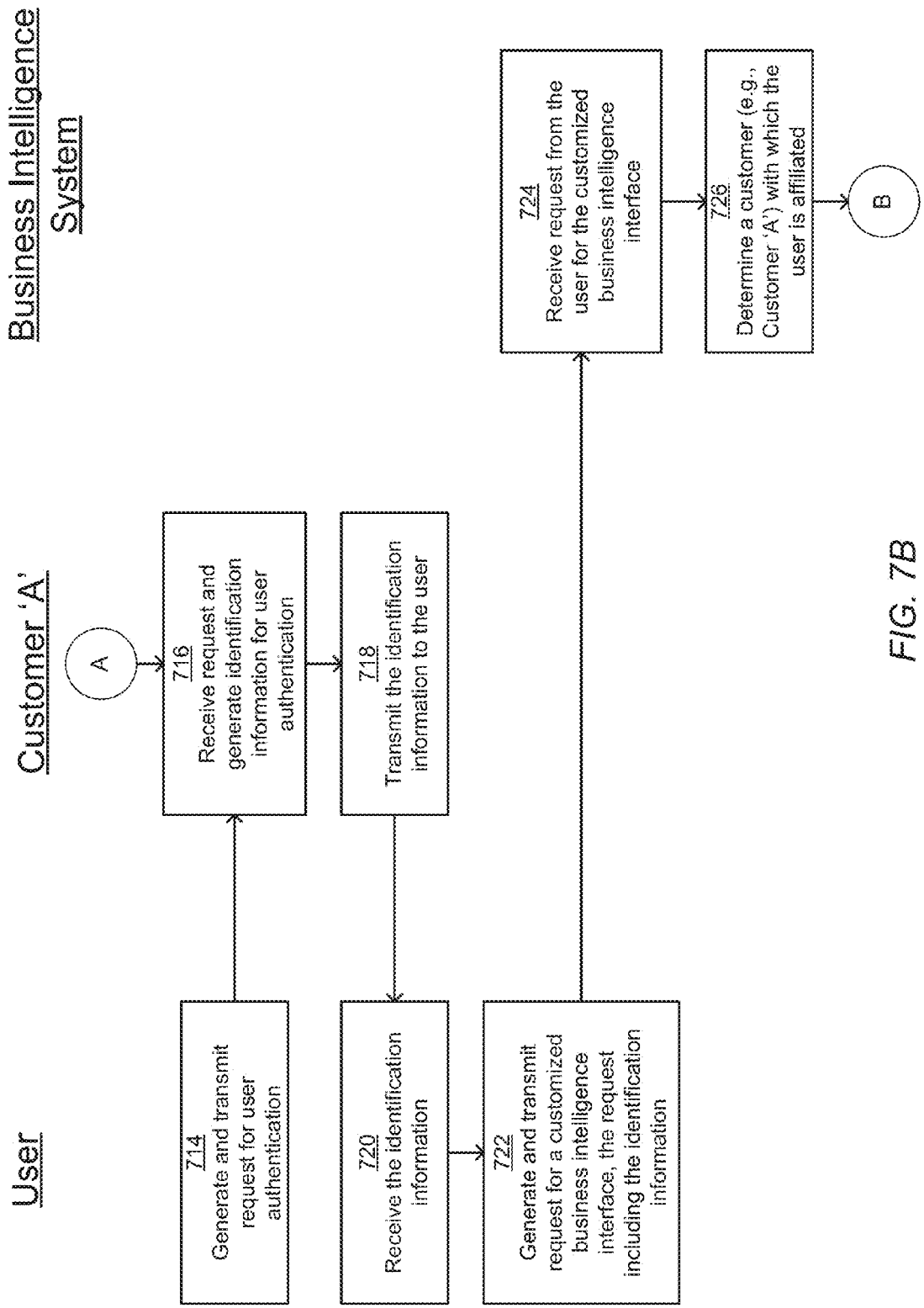

FIG. 7B illustrates operations associated with authenticating and identifying a user affiliated with Customer 'A' when the user requests the business intelligence system for a customized business intelligence interface.

A user generates (714) and transmits to Customer 'A' a request for user authentication. Customer 'A' receives (716) the request for user authentication and generates identification information for user authentication, so as to authorize the user to have access to customized business intelligence solutions associated with Customer 'A.' The user receives (720) the identification information. The user generates and transmits (722), to the business intelligence system, a request for a customized business intelligence interface, the request including the identification information.

In alternative embodiments, the user generates and transmits a request for user authentication directly to the business intelligence system (e.g., without requesting authentication from Customer 'A'). In such embodiments, the business intelligence system receives the request for user authentication, directly from the user, and generates identification information for user authentication. Business intelligence system 125 then directly authorizes the user to obtain access to the customized business intelligence solutions associated with Customer 'A.'

Business intelligence system receives (724) a request from the user for the customized business intelligence interface (e.g., explained with reference to FIGS. 3A-3D, 4A-4D, 5A-5B, and 6A-6D). Business intelligence system determines (726) a customer (in this example, Customer 'A') with which the user is affiliated (e.g., based on the identification information provided by the user).

Figure 7C:
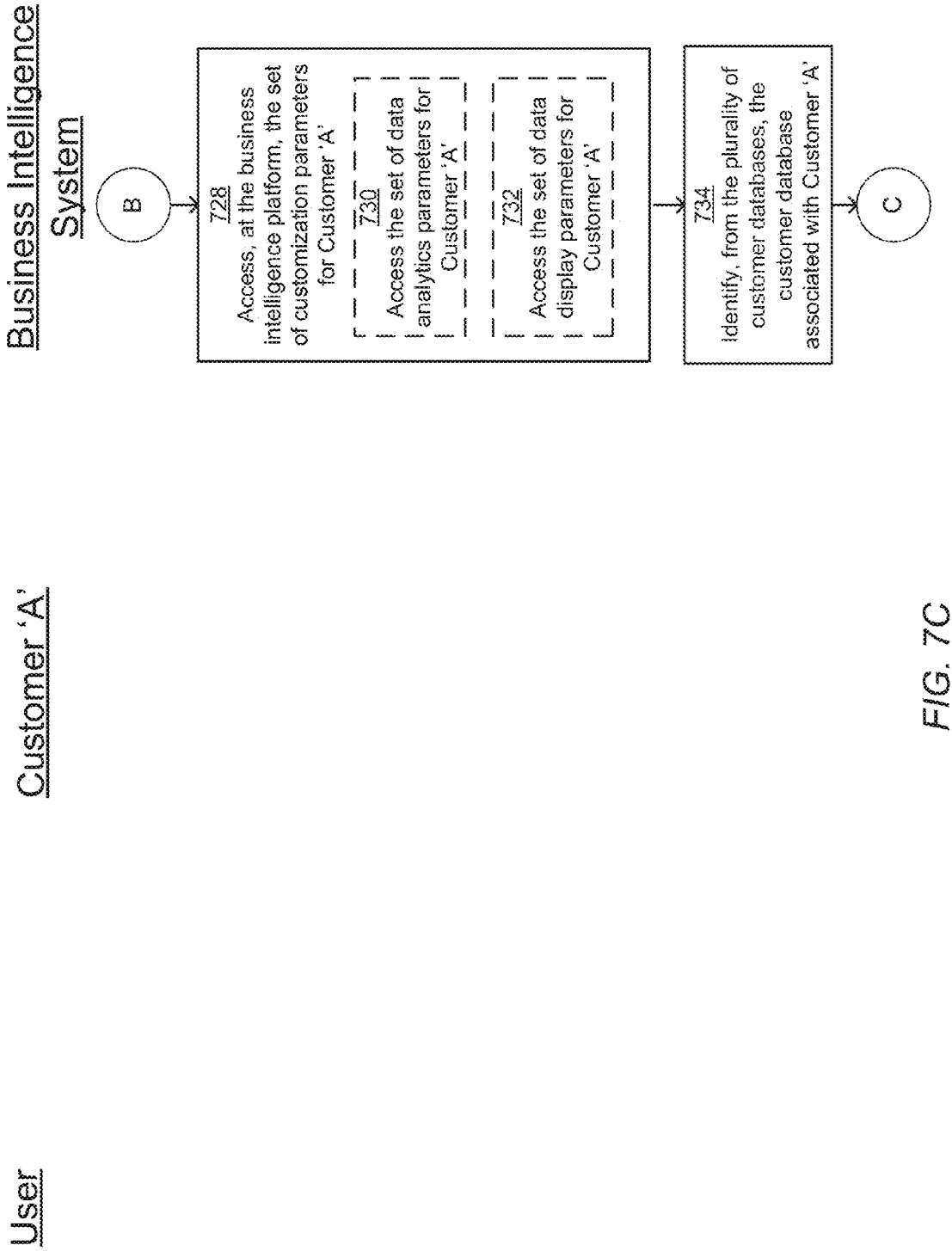
Figure 7D:
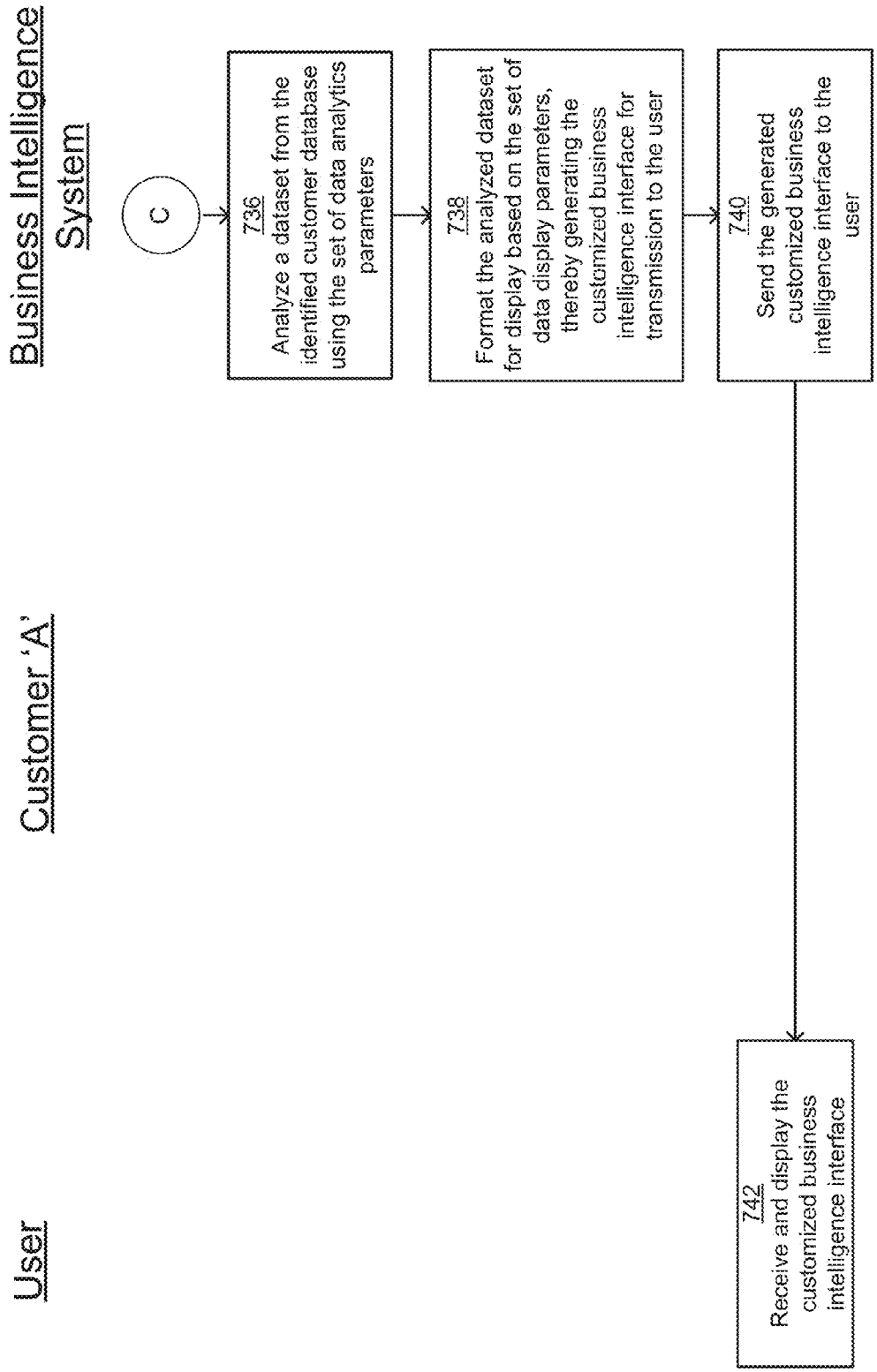

FIGS. 7C-7D illustrate operations associated with providing the user affiliated with Customer 'A' the customized business intelligence interface, based on customer data and customization parameters associated with Customer 'A'.

Business intelligence system accesses (728), at the consolidated business intelligence platform, the set of customization parameters for Customer 'A' (e.g., from the unified metadata layer 160 of multi-tenant-platform 130 shown in FIG. 1B). Toward this end, business intelligence system accesses (730) the set of data analytics parameters for Customer 'A' (e.g., explained with reference to FIGS. 3A-3D, 4A-4D, 5A-5B, and 6A-6D) and business intelligence system accesses (732) the set of data display parameters for Customer 'A' (e.g., explained with reference to FIGS. 2A-2B). Business intelligence system identifies (734), from the plurality of customer databases (e.g., from customer databases 170, FIG. 1B), the customer database associated with Customer 'A'. The customer database may be a stored database that has been replicated from the customer's system, be a source of real-time data from the customer's system, be a combination thereof, or any source of the customer's information that can be used for the analytics provided to the user.

Business intelligence system analyzes (736) a dataset from the identified customer database using the set of data analytics parameters. In some embodiments, the dataset from the identified customer database includes raw business data of commercial significance to Customer 'A'. The business intelligence system analyzes the raw business data by applying data analysis methodology (e.g., using methods including statistical, aggregation or dimensional analysis of the customer data), data analysis models, or data analysis metrics to process the raw business data (as explained with reference to FIGS. 3A-3D, 4A-4D, 5A-5B, and 6A-6D) in order to distil key patterns or statistical trends from the raw data thereby facilitating a viewing user to make speedy and meaningful conclusions from the raw data and to enable efficient and effective strategic, tactical, and operational insights and decision-making.

Business intelligence system formats (738) the analyzed dataset for display based on the set of data display parameters (e.g., as described with reference to FIGS. 2A-2B), thereby generating the customized business intelligence interface for transmission to the user. Business intelligence system sends (740) the generated customized business intelligence interface to the user. The user receives and displays (742) the customized business intelligence interface.

Figure 8A:
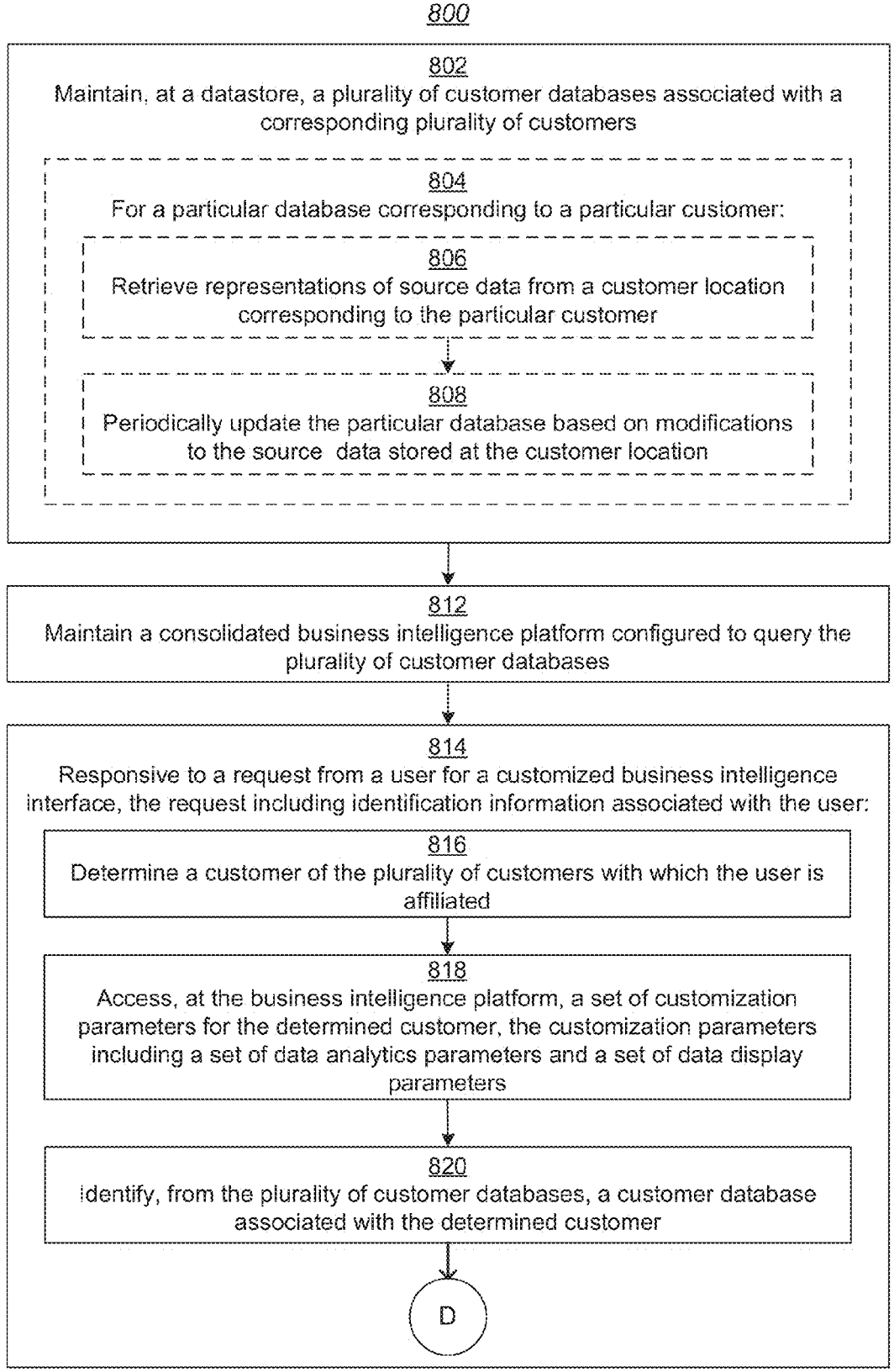
Figure 8B:
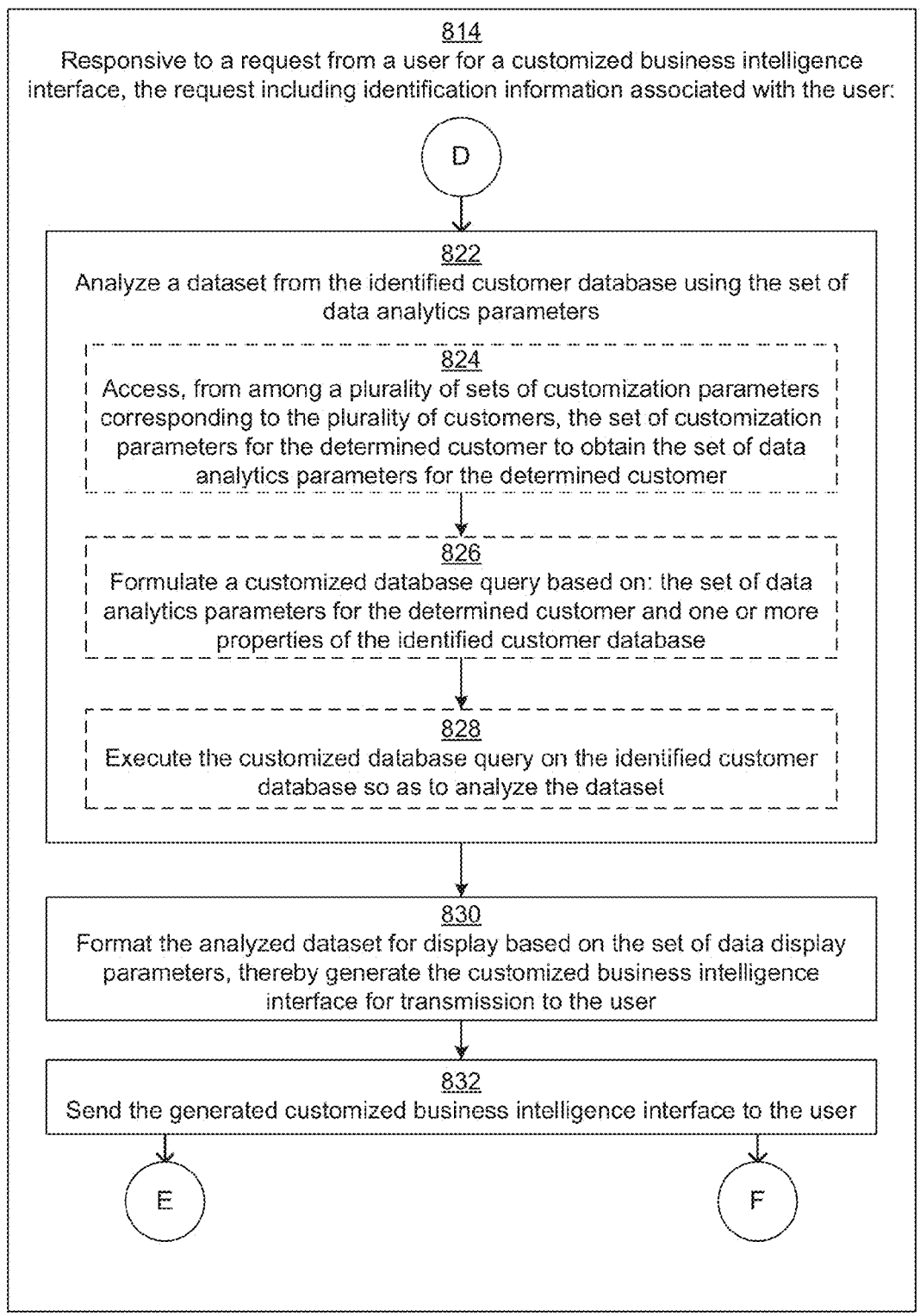

FIGS. 8A-8C include a flowchart illustrating method 800 performed on a business intelligence system for providing customized business intelligence analytics, in accordance with some embodiments.

Business intelligence system 125 optionally maintains (802), at a datastore, a plurality of customer databases associated with a corresponding plurality of customers. For a particular database corresponding to a particular customer: business intelligence system 125 retrieves (806) representations of source data (e.g., optionally with modifications to the source data to facilitate efficient query-processing) from a customer location (e.g., from a customer server remote from the business intelligence system) corresponding to the particular customer. Business intelligence system 125 periodically updates (808) the particular database based on modifications to the source data stored at the customer location. In alternative embodiments, business intelligence system 125 accesses such customer data or data representative of such customer data from one or more systems remote from the business intelligence system (e.g., a customer location, a third party location, and so on), rather than maintaining such customer data in the datastore at the business intelligence system 125.

Business intelligence system 125 maintains (812) a consolidated business intelligence platform configured to query the plurality of customer databases. In some embodiments, a consolidated business intelligence platform or a multi-tenant platform (e.g., multi-tenant platform 130 as shown in FIG. 1B) is a single common unified platform that is capable of querying or interfacing with each of the customer databases (or other customer or third party sources of customer data) corresponding to the plurality of customers so as to retrieve business intelligence data corresponding to the respective customers. In some embodiments, the consolidated business intelligence platform is a single multi-tenant platform (e.g., multi-tenant platform 130, shown in FIG. 1B) that includes a single unified metadata layer, a single analytics engine, and an application layer that together provide capability and flexibility to retrieve, process (e.g., analyze or manipulate), and format for display business intelligence data and a customized business intelligence user interface for each of the customers of the plurality of customers.

In other words, the single consolidated business intelligence platform has the flexibility to retrieve, process (e.g., analyze or manipulate), and format business intelligence data corresponding to a plurality of underlying customer databases (of a plurality of data types and from a plurality of data sources) in a customer- and data-agnostic manner.

In some embodiments, the unified metadata layer (e.g., metadata layer 160 shown in FIG. 1B) stores a plurality of sets of customization parameters (including set of data analytics parameters for the determined customer) correspondingly for the plurality of customers, an analytics engine (e.g., analytics engine 150 shown in FIG. 1B) that is configured to, responsive to a request from a user to provide a customized business intelligence interface, analyze a dataset retrieved from a customer database to which the user has authorization, based on the set of data analytics parameters for the determined customer, and an application layer configured to, responsive to the request from the user, generate the customized business intelligence interface for transmission or sending to the user.

Responsive to a request (814) from a user for a customized business intelligence interface, the request including identification information associated with the user, business intelligence system 125 performs one or more of operations 816-836.

Business intelligence system 125 determines (816) a customer of the plurality of customers with which the user is affiliated. Business intelligence system 125 accesses (818), at the business intelligence platform, a set of customization parameters for the determined customer, the customization parameters including a set of data analytics parameters and a set of data display parameters. For example, in the illustration shown in FIG. 1B, if the user is associated with customer 190(*a*), then business intelligence system 125 accesses the set of customization parameters (e.g., metadata 160(*a*)) corresponding to customer 190(*a*) from the unified metadata layer 160.

In some embodiments, the set of customization parameters for the determined customer is custom-provided by the determined customer so as to control visual appearance (e.g., as explained with reference to FIGS. 2A-2B above) and functionality (e.g., as explained with reference to 3A-3D, 4A-4D, 5A-5B, and 6A-6D above) of customized business analytics rendered for display to one or more users affiliated with the determined customer (e.g., to effect visual appearance and functionality of the generated customized business intelligence interface sent to the user).

In some embodiments, business intelligence system 125 provides the determined customer modification rights to the set of customization parameters for the determined customer, thereby enabling the determined customer to modify one or more parameters of: the set of data analytics parameters associated with the determined customer and the set of data display parameters associated with the determined customer.

Business intelligence system 125 identifies (820), from the plurality of customer databases, a customer database associated with the determined customer. For example, in the illustration shown in FIG. 1B, if the user is associated with customer 190(*a*), then business intelligence system 125 identifies customer database 170(*a*) as being associated with customer 190(*a*).

Business intelligence system 125 analyzes (822) a dataset from the identified customer database using the set of data analytics parameters (and, optionally, values of one or more of the set of data analytics parameters). In some embodiments, business intelligence system 125 accesses (824), from among a plurality of sets of customization parameters (e.g., stored collectively in the consolidated business intelligence platform) corresponding to the plurality of customers, the set of customization parameters for the determined customer to obtain the set of data analytics parameters for the determined customer.

Business intelligence system 125 formulates (826) a customized database query based on: the set of data analytics parameters for the determined customer and one or more properties (e.g., data type, nature or type of business intelligence data, physical data storage type or logical data storage type) of the identified customer database. Business intelligence system 125 executes (828) the customized database query on the identified customer database so as to analyze the dataset.

Business intelligence system 125 formats (830) the analyzed dataset for display based on the set of data display parameters (and, optionally, values of one or more of the set of data display parameters), thereby generating the customized business intelligence interface for transmission to the user, as explained with reference to FIGS. 2A-2B.

In some embodiments, business intelligence system 125 accesses, from among a plurality of sets of customization parameters (e.g., stored in the consolidated business intelligence platform or in the multi-tenant platform, as described with reference to FIG. 1B) corresponding to the plurality of customers, the set of customization parameters for the determined customer to obtain the set of data display parameters for the determined customer; accesses the analyzed dataset; and formats the analyzed dataset, for presentation on the customized business intelligence interface, based on the set of data display parameters; and formats, based on the set of data display parameters, one or more additional user interface elements associated with the customized business intelligence interface.

In some embodiments, as explained with reference to FIGS. 2A-2B, one or more additional user interface elements associated with the customized business intelligence interface correspond to: text content (such as titles for content, application title, text information, fonts, email content, textual presentation or representation of the analyzed dataset), graphical content (e.g., color palettes, logos, browser favicon in address bar, desktop icon, background images, graphical presentation or representation of the analyzed dataset), metadata content (e.g., webpage URLs, domain names, link destinations, cascaded style sheets), or any combination thereof.

Business intelligence system 125 sends (832) the generated customized business intelligence interface to the user. In some embodiments, the customized business intelligence solutions and interfaces transmitted for display to the user comprise a stand-alone application. Accordingly, in such embodiments, the request from a user for a customized business intelligence interface corresponds to a request to display an isolated (e.g., stand-alone, decoupled from any other user interface or application) user interface corresponding to the customized business intelligence interface. In alternative embodiments, customized business intelligence solutions and interfaces are embedded in a parent application. Accordingly, in such embodiments, the request from a user for the customized business intelligence interface corresponds to a request from a primary application to display the customized business intelligence interface as an embedded user interface within the primary application.

In some embodiments, upon sending the customized business intelligence interface for display to the user, the business intelligence system 125 disables (834) the user from modifying one or more parameters of the set of customization parameters, thereby assigning the user view-only rights to one or more user interface elements of the customized business intelligence interface. In other words, the set of customization parameters are predefined by the customer and access or modification rights to the set of customization parameters are only provided to the customer. The user is disabled from modifying (e.g., not allowed to modify) the customization parameters at run-time.

In some embodiments, upon sending the customized business intelligence interface for display to the user, the business intelligence system 125 provides (836) the user modification rights to one or more parameters of the set of customization parameters, thereby enabling the user to modify one or more parameters of: the set of data analytics parameters and the set of data display parameters. Consequently, the user has modification rights to the customized business intelligence interface so as to modify one or more user interface elements of the customized business intelligence interface. In other words, in some embodiments, a user can modify the customization parameters at run-time in an ad-hoc approach.

It should be understood that the particular order in which the operations in FIGS. 8A-8C have been described are merely exemplary and are not intended to indicate that the described order is the only order in which the operations could be performed. One of ordinary skill in the art would recognize various ways to reorder the operations described herein. Additionally, it should be noted that details of other processes described herein with respect to method 700 (described herein with reference to FIGS. 7A-7D) are also applicable in an analogous manner to method 800 described above with respect to FIGS. 8A-8C. For example, the business data, customization parameters, data display parameters, data analytics parameters, described above with reference to method 800 may have one or more of the characteristics of the various the business data, customization parameters, data display parameters, data analytics parameters, described herein with reference to method 700. For brevity, these details are not repeated here.

As used herein, the term "user" may refer to an individual who accesses the system directly using a client device. Alternatively, the term may refer to an application that accesses the system to obtain analytics therefrom, which may then be provided to a user after possibly further manipulation of the data and analytics. In addition, the request from the user for a customized business intelligence interface may be received in a single part or in multiple parts, where the information identifying the user as part of the request may be sent separately, sent each time, or stored in connection with an account of the user. Moreover, a user may be "affiliated" with a customer in any way that the customer provides access to the user with business analytics in the multi-tenant environment.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing customized business analytics at a multi-tenant platform of a business intelligence system, the method comprising:
    maintaining, at a datastore, a plurality of customer databases associated with a corresponding plurality of customers, wherein a customer is associated with a plurality of users;
    maintaining the business intelligence system, the maintaining comprising, for each of the plurality of customers:
        receiving a set of data analytics parameters for the customer, the set of data analytics parameters including one or more data analysis metrics, each data analysis metric having a metric definition specifying a measure of performance associated with a business of the customer; and
        storing, the set of data analytics parameters for the customer;
    receiving, by the multi-tenant platform, a first query associated with a first customer, from a first client device distinct from the business intelligence system;

responsive to receiving the first query:
    accessing, by a processor of the multi-tenant platform of the business intelligence system, a first set of data analytics parameters for the first customer, the first set of data analytics parameters previously stored in the business intelligence system;
    identifying, from the plurality of customer databases, a first customer database associated with the first customer;
    generating, by the processor, a first customized query from the first query, the first customized query using the first set of data analytics parameters, the first set of data analytics parameters defining at least a first data analysis metric associated with the first customer, the first customized query configured to return a first dataset based on the metric definition of the first data analysis metric;
    executing the first customized query using the first customer database to determine a first dataset based on the first data analysis metric;
    formatting the first dataset for display, thereby generating a first user interface configured to visualize the first dataset based on the first data analysis metric; and
    sending the first user interface to the first client device associated with the first customer;
receiving, by the multi-tenant platform, a second query associated with a second customer, from a second client device distinct from the business intelligence system, the second query identical to the first query; and
responsive to receiving the second query:
    accessing, by the processor of the multi-tenant platform of the business intelligence system, a second set of data analytics parameters for the second customer, the second set of data analytics parameters previously stored at the business intelligence system;
    identifying, from the plurality of customer databases, a second customer database associated with the second customer;
    generating, by the processor, a second customized query from the second query, the second customized query using the second set of data analytics parameters, the second customized query being distinct from the first customized query, the second set of data analytics parameters defining at least a second data analysis metric associated with the second customer, the second customized query configured to return a second dataset based on the metric definition of the second data analysis metric;
    executing the second customized query using the second customer database to determine a second dataset based on the second data analysis metric;
    formatting the second dataset for display, thereby generating a second user interface configured to visualize the second dataset based on the second data analysis metric; and
    sending the second user interface to the second client device associated with the second customer.

2. The method of claim 1, wherein:
each database of the plurality of customer databases includes data representative of corresponding source data stored at a corresponding customer location; and
maintaining, at the datastore, the plurality of customer databases associated with the corresponding plurality of customers comprises, for a particular database corresponding to a particular customer:
    retrieving representations of source data from a customer location corresponding to the particular customer; and
    periodically updating the particular database based on modifications to the source data stored at the customer location.

3. The method of claim 1, wherein the set of data analytics parameters for each given customer comprise one or more parameters, the one or more parameters custom-provided by the given customer and stored in the multi-tenant platform, the set of data analytics parameters defining an analytical framework for processing business intelligence data stored in a customer database associated with the given customer.

4. The method of claim 1, further comprising:
responsive to receiving the first query:
    accessing, at the multi-tenant platform, a first set of data display parameters including one or more parameters, custom-provided by the first customer to control visual appearance of the first user interface, wherein the first dataset is formatted for display based on the first set of data display parameters; and
responsive to receiving the second query:
    accessing, at the multi-tenant platform, a second set of data display parameters including one or more parameters, custom-provided by the second customer to control visual appearance of the second user interface,
    wherein the second dataset is formatted for display based on the second set of data display parameters.

5. The method of claim 4, wherein the first and the second set of data display parameters define visual display properties of one or more of:
text content displayed on the first or the second user interface,
graphical content displayed on the first or the second user interface, or
metadata content associated with the first or the second user interface.

6. The method of claim 1, wherein the set of data analytics parameters for a given customer is custom-provided by the given customer to control functionality of customized business analytics and query-customization for the given customer.

7. The method of claim 1, further comprising, providing a given customer, modification rights to a set of data analytics parameters for the given customer, thereby enabling the given customer to modify one or more parameters of:
a set of data analytics parameters associated with the given customer and
a set of data display parameters associated with the given customer.

8. The method of claim 1, further comprising, upon sending a customized user interface for display to a user, disabling the user from modifying one or more parameters of a set of data analytics parameters, thereby assigning the user, view-only rights to one or more user interface elements of the customized user interface.

9. The method of claim 1, further comprising, upon sending a customized user interface for display to a user, providing the user, modification rights to one or more parameters of the set of data analytics parameters to modify one or more user interface elements of the first or the second user interface.

10. The method of claim 1, wherein the generated user interface comprises one or more of: a dashboard, a business report, a goal tracking interface, a performance tracking interface, one or more charts for data visualization.

11. The method of claim 1, wherein processing a customized query for a given user using a corresponding customer database comprises:
analyzing data from the corresponding customer database by applying one or more of: statistical, aggregation, or dimensional data analysis methodology to process data of the customer database to obtain statistical trends underlying the data.

12. The method of claim 1, wherein the multi-tenant platform of a business intelligence system comprises:
a unified metadata layer that stores a plurality of sets of customization parameters correspondingly for the plurality of customers, including a set of data analytics parameters and a set of data display parameters for each given customer;
an analytics engine that is configured to, responsive to receiving a query from a user associated with the given customer, generate a customized query corresponding to the given customer by modifying the received query using the previously stored set of data analytics parameters for the given customer; and
an application layer configured to, responsive to receiving a request from the user, generate a user interface for transmission to the user.

13. A business intelligence system, comprising:
one or more processors;
memory; and
one or more programs stored in the memory, the one or more programs comprising instructions that when executed by the one or more processors, cause the one or more processors to:
maintain, at a datastore, a plurality of customer databases associated with a corresponding plurality of customers, wherein a customer is associated with a plurality of users;
maintain the business intelligence system, the maintaining comprising, for each of the plurality of customers:
receiving a set of data analytics parameters for the customer, the set of data analytics parameters including one or more data analysis metrics, each data analysis metric having a metric definition specifying a measure of performance associated with a business of the customer; and
storing, the set of data analytics parameters for the customer; and
receive a first query associated with a first customer from a client device distinct from the business intelligence system;
responsive to receiving the first query:
access, a first set of data analytics parameters for the first customer, the first set of data analytics parameters previously stored in the business intelligence system;
identify, from the plurality of customer databases, a first customer database associated with the first customer;
generate a first customized query from the first query, the first customized query using the first set of data analytics parameters, the first set of data analytics parameters defining at least a first data analysis metric associated with the first customer, the first customized query configured to return a first dataset based on the metric definition of the first data analysis metric;
execute the first customized query using the first customer database to determine a first dataset based on the data analysis metric;
format the first dataset for display, thereby generate a first user interface configured to visualize the first dataset based on the first data analysis metric; and
send the first user interface to the first client device associated with the first customer;
receive a second query associated with a second customer, from a second client device distinct from the business intelligence system, the second query identical to the first query; and
responsive to receiving the second query:
access a second set of data analytics parameters for the second customer, the second set of data analytics parameters previously stored at the business intelligence system;
identify, from the plurality of customer databases, a second customer database associated with the second customer;
generate a second customized query from the second query, the second customized query using the second set of data analytics parameters, the second customized query being distinct from the first customized query, the second set of data analytics parameters defining at least a second data analysis metric associated with the second customer, the second customized query configured to return a second dataset based on the metric definition of the second data analysis metric;
execute the second customized query using the second customer database to determine a second dataset based on the second data analysis metric;
format the second dataset for display, thereby generating a second user interface configured to visualize the second dataset based on the second data analysis metric; and
send the second user interface to the second client device associated with the second customer.

14. A non-transitory computer-readable storage medium containing computer program code comprising instructions for:
maintaining, at a datastore, a plurality of customer databases associated with a corresponding plurality of customers, wherein a customer is associated with a plurality of users;
maintaining a business intelligence system, the maintaining comprising, for each of the plurality of customers:
receiving a set of data analytics parameters for the customer, the set of data analytics parameters including one or more data analysis metrics, each data analysis metric having a metric definition specifying a measure of performance associated with a business of the customer; and
storing, the set of data analytics parameters for the customer; and
receiving a first query associated with a first customer, from a first client device distinct from the business intelligence system;
responsive to receiving the first query:
accessing a first set of data analytics parameters for the first customer, the first set of data analytics parameters previously stored in the business intelligence system;

identifying, from the plurality of customer databases, a first customer database associated with the first customer;

generating a first customized query from the first query, the first customized query using the first set of data analytics parameters, the first set of data analytics parameters defining at least a first data analysis metric associated with the first customer, the first customized query configured to return a first dataset based on the metric definition of the first data analysis metric;

executing the first customized query using the first customer database to determine a first dataset based on the data analysis metric;

formatting the first dataset for, thereby generating a first user interface configured to visualize the first dataset based on the first data analysis metric; and sending the first user interface to the first client device associated with the first customer;

receive a second query associated with a second customer, from a second client device distinct from the business intelligence system, the second query identical to the first query; and responsive to receiving the second query:
accessing a second set of data analytics parameters for the second customer, the second set of data analytics parameters previously stored at the business intelligence system;

identifying, from the plurality of customer databases, a second customer database associated with the second customer;

generating a second customized query from the second query, the second customized query using the second set of data analytics parameters, the second customized query being distinct from the first customized query, the second set of data analytics parameters defining at least a second data analysis metric associated with the second customer, the second customized query configured to return a second dataset based on the metric definition of the second data analysis metric;

executing the second customized query using the second customer database to determine a second dataset based on the second data analysis metric;

formatting the second dataset for display, thereby generating a second user interface configured to visualize the second dataset based on the second data analysis metric; and sending the second user interface to the second client device associated with the second customer.

15. The non-transitory computer-readable storage medium of claim 14, wherein:
each database of the plurality of customer databases includes data representative of corresponding source data stored at a corresponding customer location; and maintaining, at the datastore, the plurality of customer databases associated with the corresponding plurality of customers comprises, for a particular database corresponding to a particular customer:
retrieving representations of source data from a customer location corresponding to the particular customer; and
periodically updating the particular database based on modifications to the source data stored at the customer location.

16. The non-transitory computer-readable storage medium of claim 14, further comprising:
responsive to receiving the first query:
accessing a first set of data display parameters including one or more parameters, custom-provided by the first customer to control visual appearance of the first user interface, wherein the first dataset is formatted for display based on the first set of data display parameters; and
responsive to receiving the second query:
accessing a second set of data display parameters including one or more parameters, custom-provided by the second customer to control visual appearance of the second user interface,
wherein the second dataset is formatted for display based on the second set of data display parameters.

17. The non-transitory computer-readable storage medium of claim 16, wherein the first and the second set of data display parameters define visual display properties of one or more of:
text content displayed on the first or the second user interface,
graphical content displayed on the first or the second user interface, or
metadata content associated with the first or the second user interface.

18. The non-transitory computer-readable storage medium of claim 14, further storing instructions for, providing a given customer, modification rights to a set of data analytics parameters for the given customer, thereby enabling the given customer to modify one or more parameters of:
a set of data analytics parameters associated with the given customer and
a set of data display parameters associated with the given customer.

19. The non-transitory computer-readable storage medium of claim 14, further storing instructions for, upon sending a customized user interface for display to a user, disabling the user from modifying one or more parameters of a set of data analytics parameters, thereby assigning the user, view-only rights to one or more user interface elements of the first or the second user interface.

* * * * *

UNITED STATES PATENT AND TRADEMARK OFFICE
CERTIFICATE OF CORRECTION

PATENT NO. : 9,870,543 B2  
APPLICATION NO. : 14/051469  
DATED : January 16, 2018  
INVENTOR(S) : Šitina et al.

Page 1 of 1

It is certified that error appears in the above-identified patent and that said Letters Patent is hereby corrected as shown below:

On the Title Page

Item (71) Applicant, delete "San Francsicso, CA" and insert --San Francisco, CA--.

In the Claims

In Column 19, Claim 10, Line 2, delete "interface, one or more charts" and insert --interface, and one or more charts--.

Signed and Sealed this  
Third Day of July, 2018

Andrei Iancu  
*Director of the United States Patent and Trademark Office*